US012598115B2

(12) United States Patent
Sze et al.

(10) Patent No.: US 12,598,115 B2
(45) Date of Patent: Apr. 7, 2026

(54) SYSTEMS AND METHODS FOR PUSH-BASED DATA COMMUNICATIONS

(71) Applicant: DEJERO LABS INC., Waterloo (CA)

(72) Inventors: David Pui Keung Sze, Waterloo (CA); Imad Azzam, Waterloo (CA); George Richard Jones, Waterloo (CA)

(73) Assignee: DEJERO LABS INC., Waterloo (CA)

( * ) Notice: Subject to any disclaimer, the term of this patent is extended or adjusted under 35 U.S.C. 154(b) by 37 days.

(21) Appl. No.: 18/273,237

(22) PCT Filed: Jan. 19, 2022

(86) PCT No.: PCT/CA2022/050077
§ 371 (c)(1),
(2) Date: Jul. 19, 2023

(87) PCT Pub. No.: WO2022/155738
PCT Pub. Date: Jul. 28, 2022

(65) Prior Publication Data
US 2024/0098155 A1      Mar. 21, 2024

Related U.S. Application Data

(60) Provisional application No. 63/183,952, filed on May 4, 2021, provisional application No. 63/139,286, filed on Jan. 19, 2021.

(51) Int. Cl.
*G06F 15/16*        (2006.01)
*H04L 41/5009*      (2022.01)
(Continued)

(52) U.S. Cl.
CPC ...... *H04L 41/5012* (2013.01); *H04L 43/0852* (2013.01); *H04L 43/0876* (2013.01)

(58) Field of Classification Search
CPC ... H04L 45/24; H04L 45/302; H04L 47/2408; H04L 47/2441; H04L 47/56; H04L 43/08; H04L 47/6295; H04L 41/142
See application file for complete search history.

(56) References Cited

U.S. PATENT DOCUMENTS 6,067,301 A      5/2000  Aatresh
7,190,674 B2    3/2007  Kobayakawa et al.
(Continued)

FOREIGN PATENT DOCUMENTS

WO        2018112657 A1    10/2019

OTHER PUBLICATIONS

Mathis et al. NPL, ACM SIGCOMM publication, Jul. 1998 (Year: 1998).*

(Continued)

*Primary Examiner* — Padma Mundur
(74) *Attorney, Agent, or Firm* — Norton Rose Fulbright Canada LLP

(57)        ABSTRACT

A data packet communication system is described, which can be implemented as a physical push based data packet communication device, such as a router, a gateway, or a controller circuit coupled to a router or a gateway adapted for controlling data packet communications. The data packet communication system is adapted to evaluate network capacity of each of the multiple networks at the time of a monitored communication event and assigns data packets accordingly.

20 Claims, 29 Drawing Sheets

(51) Int. Cl.
    *H04L 43/0852*     (2022.01)
    *H04L 43/0876*     (2022.01)

(56)              References Cited

U.S. PATENT DOCUMENTS

| | | |
|---|---|---|
| 2008/0062879 A1 | 3/2008 | Sivakumar et al. |
| 2009/0290534 A1 | 11/2009 | Connors et al. |
| 2014/0301223 A1 | 10/2014 | Wong et al. |
| 2017/0054648 A1 | 2/2017 | Ngo-Tan et al. |
| 2018/0131614 A1 | 5/2018 | Song |
| 2020/0236043 A1* | 7/2020 | Sze .................... H04L 47/2483 |

OTHER PUBLICATIONS

Canadian Intellectual Property Office (CIPO), Examiner's Requisition to CA 3,180,267, Mar. 27, 2024.
European Patent Office (EPO), Extended European Search Report for EP22741979, dated Oct. 25, 2024.
Canadian Intellectual Property Office (CIPO), International Search Report and Written Opinion to PCT/CA2022/050077, May 2, 2022.
Innovation, Science and Economic Development (CIPO), Office Action for CA3,180,267, dated Feb. 28, 2025.
IP Australia, Examination Report No. 1, for application No. 2022209882, dated Jul. 11, 2025.

* cited by examiner

Perform any necessary accounting for connection metadata updates and determine the set of active connections 1102

Determine an ordering of connections based on connection metadata 1104

While there are packets to send and available network capacity in the set of active connections 1106

Retreive the next packet to be sent 1108

Queue a packet to be sent on the first connection in the order which has available capacity 1110

Update the connection metadata to reflect the scheduled packet 1112

Is there available connection capacity? 1114

No

Yes

For each connection which has packets queued, send those packets to the next pipeline stage for that connection 1116

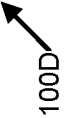

Queue a packet to be sent on the first connection in the ordering which has available capacity
1110

Update the connection metadata to reflect the scheduled packet
1112

Is there available connection capacity?
1114

NO

For each connection which has packets queued, send those packets to the next pipeline stage for that connection
1116

Perform any necessary accounting for connection metadata updates and determine the set of active connections
1102

Construct a selector based on the currently active connection set
1103

Use the selector to choose a packet to send over one of the available connections. Exit the loop if no packet is selected
1105

Determine an ordering of the active connections based on the packet's flow and flow classification in combination with the connection metadata
1107

Yes

FIG. 1E

100E

Start

1. Connections that are completely down (100% summarized loss) are considered worse than connections than have <100% summarized loss 2. PR Priority (higher priority is better)

3. MathisFactor (lower is better)

4. RoundedRTT (lower is better)

5. CapacityFactor (higher is better)

6. RoundedRtProp (lower is better)

7. RoundedBtlBw (higher is better)

8. ConnectionID (lower is better)

End

100F

Figure 6A:
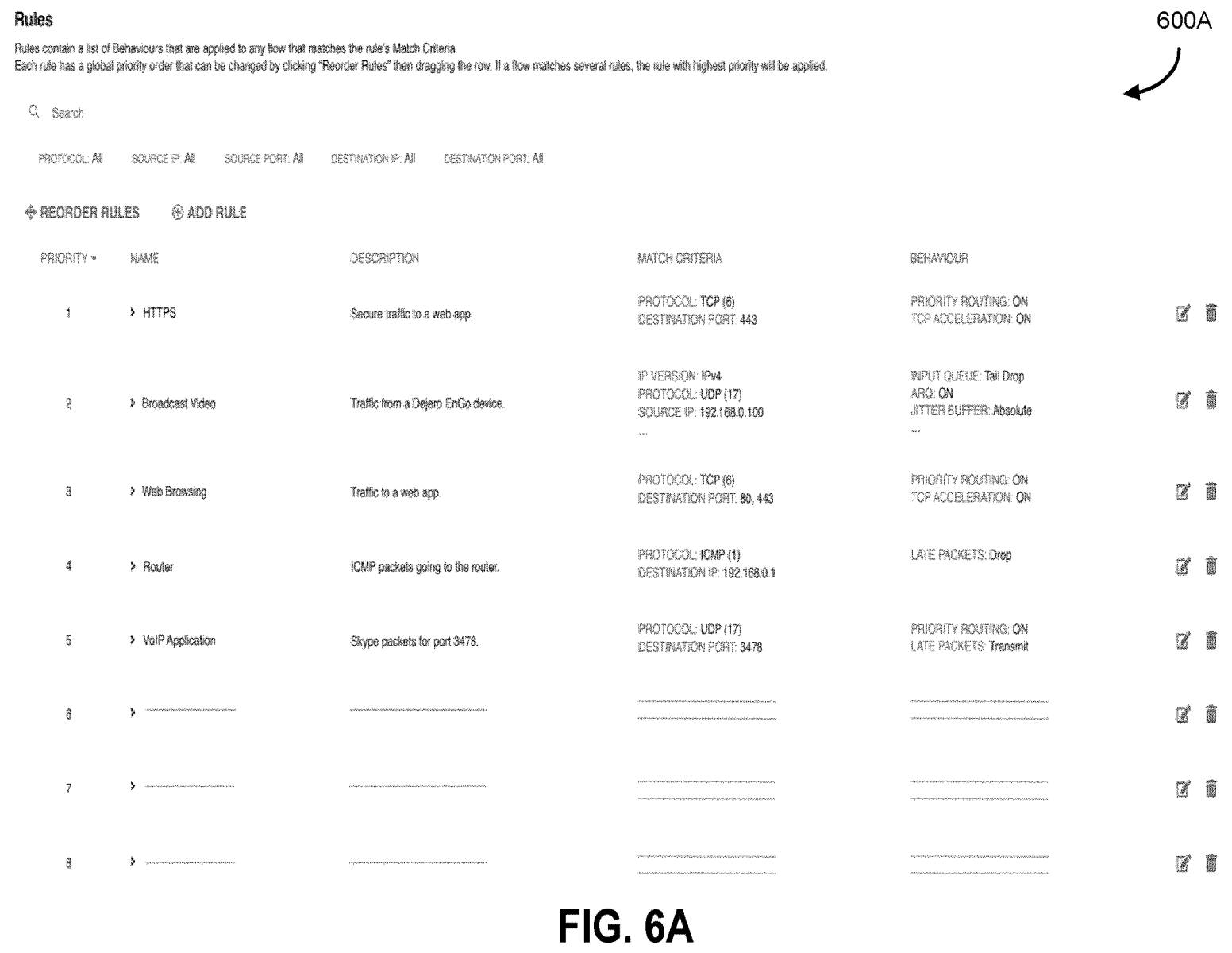

600A

Rules

Rules contain a list of Behaviours that are applied to any flow that matches the rule's Match Criteria.
Each rule has a global priority order that can be changed by clicking "Reorder Rules" then dragging the row. If a flow matches several rules, the rule with highest priority will be applied.

Q Search

PROTOCOL: All    SOURCE IP: All    SOURCE PORT: All    DESTINATION IP: All    DESTINATION PORT: All

↔ REORDER RULES    ⊕ ADD RULE

| PRIORITY ▾ | NAME | DESCRIPTION | MATCH CRITERIA | BEHAVIOUR | | |
|---|---|---|---|---|---|---|
| 1 | ⌄ HTTPS | Secure traffic to a web app. | PROTOCOL: TCP (6) DESTINATION PORT: 443 | PRIORITY ROUTING: ON TCP ACCELERATION: ON | ✎ | 🗑 |
| 2 | ⌄ Broadcast Video | Traffic from a Dejero EnGo device. | IP VERSION: IPv4 PROTOCOL: UDP (17) SOURCE IP: 192.168.0.100 | INPUT QUEUE: Tail Drop ARQ: ON JITTER BUFFER: Absolute | ✎ | 🗑 |
| 3 | ⌄ Web Browsing | Traffic to a web app. | PROTOCOL: TCP (6) DESTINATION PORT: 80, 443 | PRIORITY ROUTING: ON TCP ACCELERATION: ON | ✎ | 🗑 |
| 4 | ⌄ Router | ICMP packets going to the router. | PROTOCOL: ICMP (1) DESTINATION IP: 192.168.0.1 | LATE PACKETS: Drop | ✎ | 🗑 |
| 5 | ⌄ VoIP Application | Skype packets for port 3478. | PROTOCOL: UDP (17) DESTINATION PORT: 3478 | PRIORITY ROUTING: ON LATE PACKETS: Transmit | ✎ | 🗑 |
| 6 | ⌄ | | | | ✎ | 🗑 |
| 7 | ⌄ | | | | ✎ | 🗑 |
| 8 | ⌄ | | | | ✎ | 🗑 |

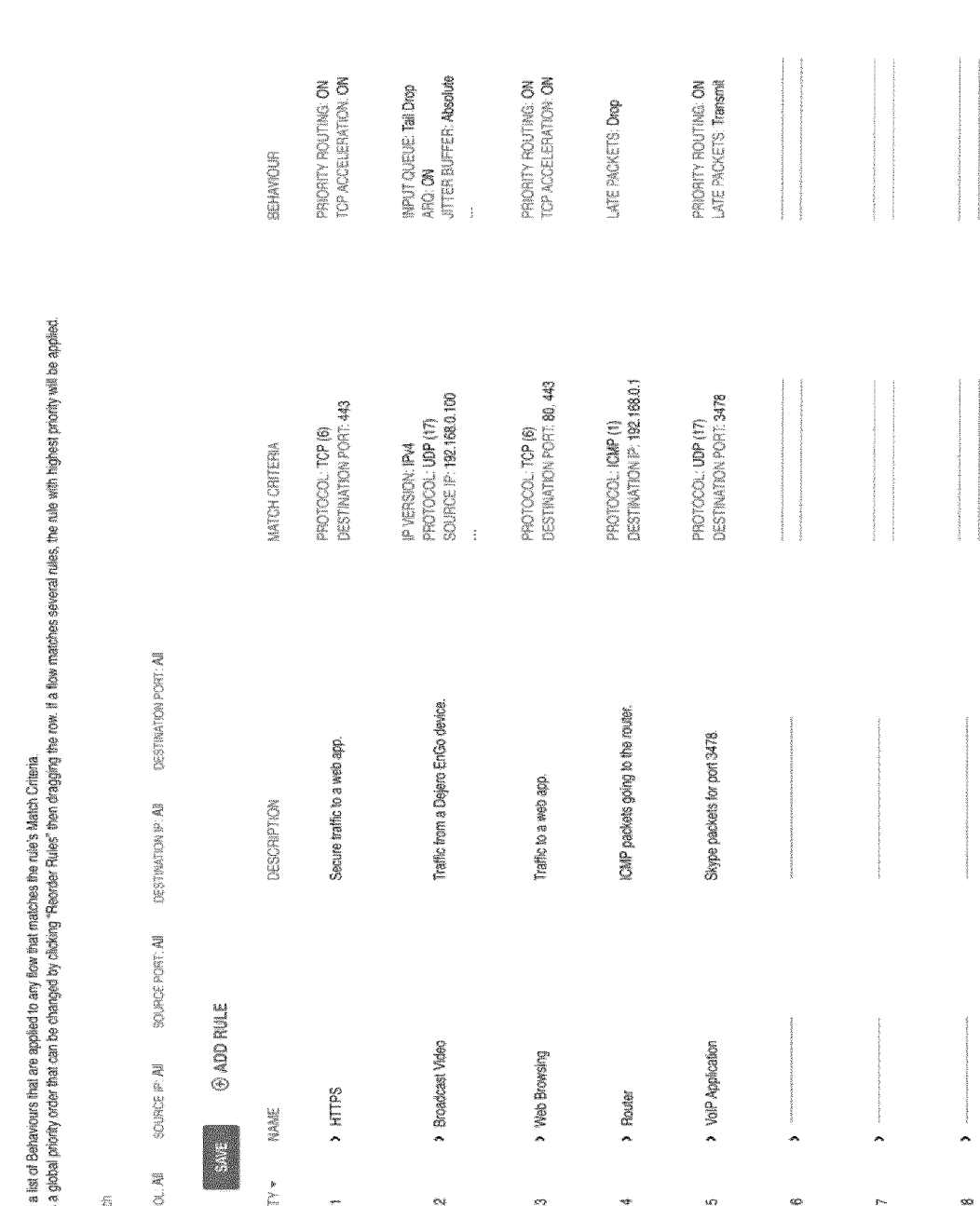

Rules

Rules contain a list of Behaviours that are applied to any flow that matches the rule's Match Criteria.
Each rule has a global priority order that can be changed by clicking "Reorder Rules" then dragging the row. If a flow matches several rules, the rule with highest priority will be applied.

Q Search

PROTOCOL: All    SOURCE IP: All    SOURCE PORT: All    DESTINATION IP: All    DESTINATION PORT: All

CANCEL    SAVE    ⊕ ADD RULE

| PRIORITY ▾ | NAME | DESCRIPTION | MATCH CRITERIA | BEHAVIOUR | | |
|---|---|---|---|---|---|---|
| ☰ 1 | ⟩ HTTPS | Secure traffic to a web app. | PROTOCOL: TCP (6) DESTINATION PORT: 443 | PRIORITY ROUTING: ON TCP ACCELERATION: ON | ✎ | ▦ |
| ☰ 2 | ⟩ Broadcast Video | Traffic from a Dejero EnGo device. | IP VERSION: IPv4 PROTOCOL: UDP (17) SOURCE IP: 192.168.0.100 ⋮ | INPUT QUEUE: Tail Drop ARQ: ON JITTER BUFFER: Absolute ⋮ | ✎ | ▦ |
| ☰ 3 | ⟩ Web Browsing | Traffic to a web app. | PROTOCOL: TCP (6) DESTINATION PORT: 80, 443 | PRIORITY ROUTING: ON TCP ACCELERATION: ON | ✎ | ▦ |
| ☰ 4 | ⟩ Router | ICMP packets going to the router. | PROTOCOL: ICMP (1) DESTINATION IP: 192.168.0.1 | LATE PACKETS: Drop | ✎ | ▦ |
| ☰ 5 | ⟩ VoIP Application | Skype packets for port 3478 | PROTOCOL: UDP (17) DESTINATION PORT: 3478 | PRIORITY ROUTING: ON LATE PACKETS: Transmit | ✎ | ▦ |
| ☰ 6 | ⟩ | | | | ✎ | ▦ |
| ☰ 7 | ⟩ | | | | ✎ | ▦ |
| ☰ 8 | ⟩ | | | | ✎ | ▦ |

Rules

Rules contain a list of Behaviours that are applied to any flow that matches the rule's Match Criteria.
Each rule has a global priority order that can be changed by clicking "Reorder Rules" then dragging the row. If a flow matches several rules, the rule with highest priority will be applied.

Search

PROTOCOL: All    SOURCE IP: All    SOURCE PORT: All    DESTINATION IP: All    DESTINATION PORT: All

REORDER RULES    ADD RULE

| PRIORITY | NAME | DESCRIPTION | MATCH CRITERIA | BEHAVIOUR | |
|---|---|---|---|---|---|
| 1 | > HTTPS | Secure traffic to a web app. | PROTOCOL: TCP (6)<br>DESTINATION PORT: 443 | PRIORITY ROUTING: ON<br>TCP ACCELERATION: ON | ✎ 🗑 |
| 2 | > Broadcast Video | Traffic from a Dejero EnGo device. | IP VERSION: IPv4<br>PROTOCOL: UDP (17)<br>SOURCE IP: 192.168.0.100<br>... | INPUT QUEUE: Tail Drop<br>ARQ: ON<br>JITTER BUFFER: Absolute<br>... | ✎ 🗑 |
| 3 | ⌄ Web Browsing | Traffic to a web app. | PROTOCOL: TCP (6)<br>DESTINATION PORT: 80, 443 | PRIORITY ROUTING: ON<br>TCP ACCELERATION: ON | ✎ 🗑 |

FULL DETAILS

| MATCH CRITERIA | BEHAVIOUR |
|---|---|
| IP VERSION: *<br>DSCP TAG: *<br>PROTOCOL: TCP (6)<br>SOURCE IP: *<br>SOURCE PORT: *<br>DESTINATION IP: *<br>DESTINATION PORT: 80, 443 | PRIORITY ROUTING: ON<br>  WAN0: Primary<br>  CELL1: Secondary<br>  CELL2: Secondary<br>  CELL3: Tertiary<br>TCP ACCELERATION: ON |

MATCHING FLOWS

| NAME | PROTOCOL | SOURCE | DESTINATION |
|---|---|---|---|
| Flow 1 | TCP (6) | 200.0.0.1:4755 | 214.3.0.2:80 |
| Flow 3 | TCP (6) | 200.0.0.1:4756 | 214.3.0.2:443 |
| Flow 5 | TCP (6) | 201.3.0.2:4462 | 214.3.0.1:80 |
| Flow 6 | TCP (6) | 154.16.0.13:4235 | 187.32.4.1:80 |

| 4 | > Router | ICMP packets going to the router. | PROTOCOL: ICMP (1)<br>DESTINATION IP: 192.168.0.1 | LATE PACKETS: Drop | ✎ 🗑 |

FIG. 6C

BDP = 16 packets
Volume = 19 packets
Goodput = 14 packets

Volume > BDP, therefore,

Goodput rate =
(Goodput portion / Full volume) x BtlBw =
(14 / 16) x BtlBw = (7/8) x BtlBw Receiver Packets exit network
buffer at BtlBw rate Goodput ack Other ack Goodput packet Other packet

900B

BDP = 16 packets
Volume = 3 packets
Goodput = 2 packets

Volume < BDP, therefore,

Goodput extra space =
BDP – Volume = 13 packets

Potential goodput rate =
((Goodput portion + Goodput extra
space) / Full volume) x BtlBw =
((2+13) / 16) x BtlBw = (15/16) x BtlBw Receiver

2

Packets exit network
buffer at BtlBw rate

Sender

■ Goodput packet          ■ Goodput ack          □ Goodput extra space

□ Other packet          ⌐¬ Other ack

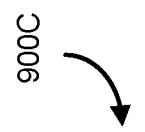

900C

BDP = 16 packets
Volume = 3 packets
Goodput = 2 packets
Cwnd = 11 packets

Volume < BDP, therefore,

Goodput extra space =
BDP − Volume = 13 packets
Limited goodput extra space =
Cwnd − Volume = 8 packets Potential goodput rate =
(Goodput portion + Limited goodput
extra space) / Full volume x BtlBw =
(2+8) / 16 x BtlBw = 10/16 x BtlBw =
5 / 8 x BtlBw

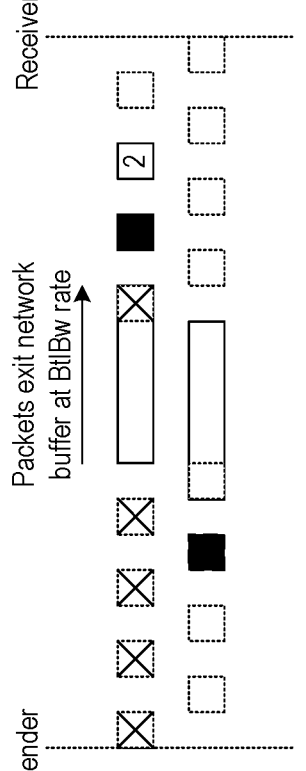

Receiver

2

Packets exit network
buffer at BtlBw rate

Sender

■ Goodput packet    ■ Goodput ack    ☐ Goodput extra space

☐ Other packet    ⌐¬ Other ack    ⊠ Congestion window reduction from BDP

FIG. 9C

SYSTEMS AND METHODS FOR PUSH-BASED DATA COMMUNICATIONS

CROSS REFERENCE

This application is a non-provisional of, and claims all benefit, including priority to, U.S. Application No. 63/139,286 and 63/183,952, both entitled SYSTEMS AND METHODS FOR PUSH-BASED DATA COMMUNICATIONS, filed 19 Jan. 2021 and 4 May 2021, incorporated herein by reference in their entireties.

This application incorporates by reference the following applications in their entireties:

PCT Application No. PCT/CA2017/051584, filed 21 Dec. 2017, entitled "PACKET TRANSMISSION SYSTEM AND METHOD".

PCT Application No. PCT/CA2018/051012, filed 22 Aug. 2018, entitled "SYSTEM AND METHOD FOR ASSESSING COMMUNICATION RESOURCES".

PCT Application No. PCT/CA2020/051090, filed 7 Aug. 2020, entitled "SYSTEMS AND METHODS FOR MANAGING DATA PACKET COMMUNICATIONS".

FIELD

Embodiments of the present disclosure relate to the field of electronic data packet communications, and more specifically, embodiments relate to devices, systems and methods for push-based data packet communications where multiple network connections are available.

INTRODUCTION

Existing data packet communication solutions for transmission of data packets via multiple available network connections rely upon static routing logic to determine how to communicate data packets through the connections. For example, systems may employ timers for each of the available connections, and the respective timer is used to determine when to pull packets from an input queue for transmission on the connection associated with the timer. These solutions assume that the connections have similar operating characteristics and availability, which trades performance for implementation simplicity, scheduling the next available data packet for transmission via the connection with the most recently expired timer. While the timer approach is simple, the computational efficiency can be impaired in certain situations.

Communication systems (e.g. LACP, ML-PPP) that treat multiple network connections as multiple instances of connections with similar operating characteristics can lead to less effective usage of the multiple connections if the multiple networks have different operating characteristics, as certain networks may be underutilized, or over-utilized. This imprecision in usage can result in greater latency times in delivering data packets, less reliable data packet delivery, more expensive data packet delivery, reduced throughput, and so forth.

Connection management solutions also experience difficulty handling applications where the available connections or their operating characteristics change over time. For example, a timer-based system can be insensitive to changing network performance, since the timers for each connection fire independently, so they may not have an accurate view of the network performance of all other connections.

Systems and methods for data communications which more efficiently utilize multiple connections to transmit data packets with smaller latency times, increased throughput, enable more reliable data packet delivery, or less expensive data packet delivery are desirable.

SUMMARY

Systems, and methods described herein include push based data packet communication systems, which can be implemented as a physical push based data packet communication device, such as a router, a gateway, or a controller circuit coupled to a router or a gateway adapted for controlling data packet communications. In another embodiment, the system can be implemented as software for use with electronic hardware or residing on memory as instruction sets to be executed by the electronic hardware, such as a communications controller board having a processor. Various embodiments are described herein for operating the push based data packet communication system to improve data communication (e.g., latency, reliability, throughput, error correction) across a plurality of connections based on monitored data communication characteristics (e.g., network traffic) associated with the connections of the plurality of connections. Corresponding computer readable media (e.g., non-transitory computer readable mediums storing machine-interpretable instruction sets for execution on processors) that operate in conjunction with data storage, computer processors and computer memory are also provided.

Embodiments described herein provide a technical improvement relative to alternative approaches, such as using static routing tables, pull scheduling (e.g., using connection-specific timers that are not necessarily synchronized). For example, the Linux kernel TCP stack uses a "pull" model to reduce the recovery time for retransmitted packets. See reference: https://groups.google.com/g/bbr-dev/c/d14XAcuTBxo/m/Pwuilo3MBAAJ.

The push based data packet communication system described herein is adapted to provide a router that can be adapted for connection (link) aggregation for granular, packet-based data distribution, enabled by real time measurements of connection characteristics relating to a blended connection to a remote peer.

As described in various embodiments herein, a multipath connection aggregation system (alternatively referred to as a blended connection system) can be modelled as a three-stage data pipeline, having a first input queue and scheduling stage, a second connection characteristics monitoring stage (e.g., providing congestion control and packet buffering, and encapsulating pacing instructions), and a third transmission stage for communicating packets to a network interface (e.g., according to pacing the instructions provided at the second stage).

The push based data packet communication system includes a scheduler configured to queue data packets for transmission in response to a monitored communication event (also called a trigger event). Example trigger events (other than a timer), include an ACK/NACK of previously transmitted WAN packets, the arrival of new data at the Input Queue, lack of feedback for a given amount of time, etc. The scheduler assigns data packets to the various networks based on their monitored characteristics at the time of the trigger event.

Monitored characteristics of an individual connection are a subset of its operating characteristics, and can include, but are not limited to, estimated throughput, measured and/or expected latency, measured packet loss, and other characteristics that can be derived from the measured or expected values. In a clarifying example, the operating characteristics may include estimated throughput, measured and/or expected latency, measured packet loss, and other characteristics that can be derived from the measured or expected values, and the monitored characteristics may be limited to estimated throughput.

The push scheduler, in contrast to a pull scheduler, evaluates monitored characteristics of each of the multiple networks at the time of the monitored communication event, and assigns data packets to the connections having available transmission capacity.

In example embodiments, the push scheduler takes into account the data packet (application) requirements, network order preferences as configured by an administrator, the monitored characteristics of the connections (other than the transmission capacity) in addition to the available transmission capacity. The push scheduler continues to assign data packets to the available networks where there is both available transmission capacity associated with the networks (with available transmission capacity being continually updated to reflect the assigned data packets) and there are data packets available for transmission. In this way, the push scheduler may utilize the available transmission capacity of the plurality of networks to a greater extent compared to the pull scheduler.

An aspect of the push scheduler is how the push scheduler is configured to computationally determine or establish the sort order for controlling the routing of data packets to the various network connections. The factors that influence its decisions include: keeping the sort order as "stable" as possible, so that packets do not get unnecessarily split over multiple WAN connections (splitting increases the chances for self-induced out-of-order and jitter events); and taking into account both measured properties of the connection, and external directives that are not measured.

Measured properties can include: packet loss over 3 separate sliding windows (500 ms, 3 s, 30 s), which is further summarized as the worst value over the three windows; current network round trip time (RTT); bandwidth and round trip propagation time (BBRv1) parameters: RtProp (network propagation delay); and BtlBw (throughput estimate). External directives, can include priority (PR) rules, among others, but can also include flow-specific rules/requirements.

In some embodiments, the BBRv1 measured properties differ from their design in the original BBRv1 IETF draft. For example, to consider embodiments that might run on systems that are less consistent in their execution time, the size of the sliding window used to compute BtlBw may change, either statically or dynamically. For similar execution consistency reasons, the input parameters used to compute RtProp may also be slightly modified.

A specific improvement based on improving a networking routing order for controlling the use of network interfaces is described in some embodiments wherein a composite property for round-trip time (RTT) and packet loss is utilized to predict throughput based upon the Mathis Equation for establishing an upper bound for TCP throughput given RTT, packet loss, and MSS. The Mathis factor can be utilized to modify the sort order for routing networked packets.

In some embodiments, over a period of time, the push scheduling can also be configured to implicitly cause a sort order along one or more implicit sort dimensions. The implicit sort dimension forces the connections that have experienced periodic bad events (e.g., latency spikes due to congestion) to bubble to the bottom of the list. The connections that are consistent in their behaviour naturally bubble to, and remain near the top.

Pull scheduling does not allow the greater utilization of network capacity, because pulling occurs based on connection-specific timers which are triggered independently of each other. Pull scheduler systems include a shared pull scheduler and a timer associated with each network of the plurality of available networks, each timer having a wake up value. When the timer wakes up to pull packets from the pull scheduler, decisions about which packets are scheduled are made based only on the current connection's monitored characteristics, because the potential wakeup time of the other connections is unknown. The resulting packet scheduling decisions are locally optimal for each individual connection at the time of the pull event, but can result in globally sub-optimal decisions where packets scheduled in an earlier pull event on one connection would have been more optimally scheduled on a separate connection whose pull request was imminent. The pull scheduler is configured to pull, from an input queue, an amount of packets based on an estimated bitrate of the corresponding network and the duration between each timer wakeup (e.g., $\frac{1}{50}$ Hz, or 20 ms).

A technical challenge associated with the push scheduler is to ensure that data packets belonging to a particular a data flow (e.g., the packets that comprise an audio file, video, etc.) are transmitted across a single network, or a relatively stable set of networks which share similar monitored characteristics that are able to meet the requirements of the flow. For example, transmitting audio packets belonging to a single data flow across two networks with different latencies requires the sequencer (i.e., the hardware or software responsible for reassembling the packets after transmission) to buffer and reorder the audio packets, possibly adding latency or failing to deliver the data packets in the original order, which consequently results in the application perceiving a high latency and an inconsistent and poor networking experience. A push scheduler that groups the connections with similar monitored characteristics has more direct control to assign data packets to connections that best meet the flow requirements.

The proposed push scheduler, in some embodiments, is configured to order the plurality of networks based on a comparison of monitored characteristics (e.g., round-trip time, bottleneck bandwidth, etc.) to reference ranges (e.g., reference ranges of transmission) of the network operating characteristics, wherein the ranges are defined to be insensitive to trivial fluctuations in the measured operating characteristics. The use of ranges allows for the push scheduler to continue to be responsive to changes in the monitored characteristics of the networks, while building in a degree of insensitivity to smaller fluctuations in the monitored characteristics.

The proposed push scheduler may be configured to assign data packets to the plurality of networks based on their ordering, promoting data packets belonging to a particular flow to be assigned to a single or relatively stable set of networks based on their monitored characteristics. In example embodiments, the push scheduler stores the ordering and continues to send packets according to the ordering until the ordering has been updated as a result of new or updated monitored characteristics.

The monitored characteristics may include a capacity factor, which is an aggregated value defined at least in part by dividing the bottleneck bandwidth by the round-trip propagation time. Capacity factor may be indicative of connections which achieve a higher bandwidth per millisecond of round-trip propagation time, indicating an efficient network. Moreover, the capacity factor may be determined by estimating the bottleneck bandwidth to the nearest order of magnitude (e.g., one, 10, 100, 1000, 10,000, etc.) or integer multiples of it (e.g. two, three . . . 20, 30, etc.), such that the capacity factor is only responsive to relatively larger changes in the measured bottleneck bandwidth value. Similarly, the capacity factor may be determined by using a ranged round-trip propagation time associated with the measured round-trip propagation time to reduce capacity factor sensitivity to fluctuations in the measured round-trip propagation time.

In example embodiments, the proposed push scheduler may further order the plurality of networks based on user input criteria. For example, the ordering may be at least in part based on a user assigned priority to each of the available networks, which allows the user to provide a preference for the order in which the networks should be used, based on external factors such as cost, information about future reliability or availability which cannot be measured or predicted, etc.

Responsive to the technical challenge of utilizing a greater amount of existing network transmission capacity, the push scheduler may be configured to identify and/or utilize transmission requirements associated with the data packets queued for transmission by using a flow classification engine (e.g., the system may receive criteria which can be used to identify particular data flow types, and utilize pre-defined transmission requirements associated with the identified data flow types). By identifying or utilizing transmission requirements of the data packets, and comparing them with the monitored characteristics of the plurality of networks, the push scheduler may be able to assign data packets to networks matching the required transmission requirements to maximize the amount of data packets transmitted over networks with suitable monitored characteristics. Transmitting packets over networks whose monitored characteristics do not match the transmission requirements may still be possible, but may result in the application generating the packets interpreting the "late" or out-of-order delivery of packets as network degradation and thereby reducing the quality of the attempted service. Example transmission requirements can include a required latency, throughout, etc.

In example embodiments, the push scheduler may use the Flow Classification Engine packets into flows, with each flow having a set of assigned transmission requirements. In another embodiment, each flow inherently has transmission requirements which form properties of the flow. This flow mapping is based on one or more elements within a header of, or associated with, the data packet. These flow transmission requirements may then be used to assign packets to one of the plurality of connections that have compatible monitored characteristics. In an example, where a data packet has been classified as a VPN data flow, which has inherent requirements that the data be delivered in order, which may include flow transmission requirements to be sent with a connection having a particular minimum reliability.

For example, the TCP/IP header, as a result of being identified as a TCP/IP 5 tuple (e.g. source and destination IP addresses, source and destination port numbers, and protocol), may be determined to be a virtual private network (VPN) dataflow, which is a dataflow that is more sensitive to ordering. As a result, the scheduler may receive transmission requirements from the Flow Classification Engine requesting that all of the data packets of the VPN dataflow are delivered in order, despite the presence of other indicators such as DSCP tags on the individual packets that might contradict this requirement. For example, some of the packets might have a DSCP tag requesting low latency, but others may request high throughput. The scheduler may map (assign) the packets to connections with monitored characteristics that meet the specific transmission requirements of DSCP tags, but only as long as the ordering requirement of the encapsulating VPN dataflow is not violated.

According to another example, the push scheduler may use the Flow Classification Engine to map packets to a flow whose transmission requirements prioritize low latency over reliability or throughput (e.g., the source may be indicative of a type of data, such as a live video stream, which may be sensitive to increased latency).

According to further example embodiments, the push scheduler may assign a priority transmission requirement to individual data packets, independent of the transmission requirements derived from the flow classification. For example, the push scheduler may be configured to assign the highest level of priority to packets which are queued for retransmission (i.e., the packets have previously been transmitted and failed).

A technical challenge associated with the push scheduler implementing dataflow or data packet priority transmission requirements is that non-urgent data packets may be continually bumped from a transmission queue, resulting in a "starvation" of the non-urgent packets in the system.

The push scheduler, responsive to starvation of non-urgent packets, may be configured to pace the rate of packet transmission by assigning a nominal wall clock time for transmission to each data packet. In example embodiments, packets are assigned wall clock times based on an estimated bottleneck bandwidth and the size of the data packet to prevent congestion.

The output queue of the network to which the data packet has been assigned in Pipeline Stage may be configured to transmit data packets according to their assigned nominal wall clock time, without bumping non-urgent packets in favour of priority packets. For example, at time zero, a non-urgent data packet may be assigned a nominal wall clock time for transmission of time three. Urgent data packets may be scheduled for transmission at time three based on the amount of available transmission capacity at the network, which available transmission capacity is reduced to incorporate the non-urgent data packet.

Continuing the example, the push scheduler may be configured to queue non-urgent data packets for later transmission where the nominal wall clock time is in the future. For example, where, at time zero, there is available network capacity at time two, the push scheduler may send the non-urgent data packet having the time stamp of time three for transmission at time two. Subsequently, the non-urgent data packet may be rescheduled for sending at time three in response to receiving a packet with a more urgent nominal wall clock time.

A technical challenge associated with the push scheduler is that, as a result of pushing data packets based on an estimated available network transmission capacity, the system may lose robustness in the event of a network failure or unacceptable amounts of network congestion.

The push based scheduler may be configured to monitor the network operating characteristics associated with each of the available networks to determine whether the monitored characteristics satisfy a congestion threshold. In example embodiments, the congestion threshold is established from a baseline profile associated with each network. For example, the lowest latency measured for packets transmitted across a particular network can form a baseline value of the network, and future transmission along that network can be compared to the baseline value. In another example embodiment the threshold may be based, at least in part, on a baseline of the round-trip time of packets. In other embodiments, the baseline could be computed using statistical approaches more complex than taking the minimum latency.

In order to increase the robustness of the push scheduler, the scheduler, in response to detecting network failure or unacceptable amounts of network congestion, may be configured to decrease the amount of transmission capacity defined as being available for transmission, or update the available transmission capacity other than in accordance with each monitored communication event. In example embodiments, the transmission capacity of a network may only be updated in response to receiving acknowledgement that a previously transmitted data packet has been received (e.g., in response to receiving an ACK). According to some embodiments, for example, the defined transmission capacity is reduced to a theoretical transmission capacity which does not include a standing queue of packets in a buffer associated with the network. In further example embodiments, the defined transmission capacity is reduced to equal the volume of data packets in flight across the particular network.

In some example embodiments, one of the networks of the plurality of networks operates according to a bandwidth on demand (BOD) principle, wherein a network administrator and/or automated network monitoring agent assigns available bandwidth for transmission to a sender based on previous transmissions or requests for bandwidth. This assignment may cause the assigned bandwidth to increase or decrease depending on the administrator or agent's prediction of future bandwidth usage. During this bandwidth assignment process, packet loss and/or latency may temporarily increase, requiring the Scheduler to make more intelligent decisions for assigning packets to connections. For example, the probing packets that are used to request more bandwidth may be marked with DSCP tags that indicate that they are lower priority, and thus are candidates to be dropped first if necessary.

A technical challenge associated with a push scheduler pushing data packets to a bandwidth on demand network is that the bandwidth on demand network may update bandwidth available for transmission infrequently, making it difficult to utilize available capacity. For example, the bandwidth on demand network may have available capacity, but as a result of the delay in allocation, this capacity may go unused. Alternately, if the push scheduler fails to consistently use sufficient capacity on the network, the administrator/agent may choose to reduce the allocated capacity, potentially making a significant change to the monitored characteristics of the network.

The push scheduler may be configured to define the transmission capacity of the bandwidth on demand network as greater than a received allocated transmission capacity, store the excess transmission capacity in a buffer associated with the bandwidth on demand network, and over-advertise the required amount of bandwidth to the administrator of the bandwidth on demand network. As a result of over-advertising the required bandwidth, the bandwidth on demand network may begin to assign greater amounts of unused bandwidth to the push scheduler. Moreover, as a result of defining the transmission capacity as greater than the received allocated transmission capacity, the push scheduler can ensure that data packets are available for transmission to utilize any increase in received allocated transmission capacity which may occur in the future.

A further technical challenge associated with the pull scheduler system is that data packets which have specified requirements are difficult to fairly distribute for transmission. For example, where a certain type of data packet requires a connection having a particular latency (e.g., a video feed), the pull scheduler system may bypass or delay said packet until an available network satisfying the latency requirements is woken up. In this way, depending on when the data packet lands in the input queue, the latency sensitive data packet may be delayed, further exacerbating latency issues.

A rate-based congestion control typically adjusts the rate based on delay and loss. The congestion detection needs to be done with a certain time lag to avoid over-reaction to spurious congestion events such as delay spikes. Despite the fact that there are two or more congestion indications, the outcome is still that there is still only one mechanism to adjust the sending rate. This makes it difficult to simultaneously reach the goals of high throughput and prompt reaction to congestion.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 1D is a flow chart of another method for transmitting data packets for ordering connections based on connection metadata, according to some example embodiments;

FIG. 1E is a flow chart of a further method for transmitting data packets based on a selected ordering of the network for assigning packets to networks, according to some example embodiments;

FIGS. 6A to 6E each show a corresponding screenshot of an interface for managing data packet transmissions, according to example embodiments.

FIG. 9C is a further diagram of in-flight goodput data, according to some example embodiments;

DETAILED DESCRIPTION

Figure 1A:
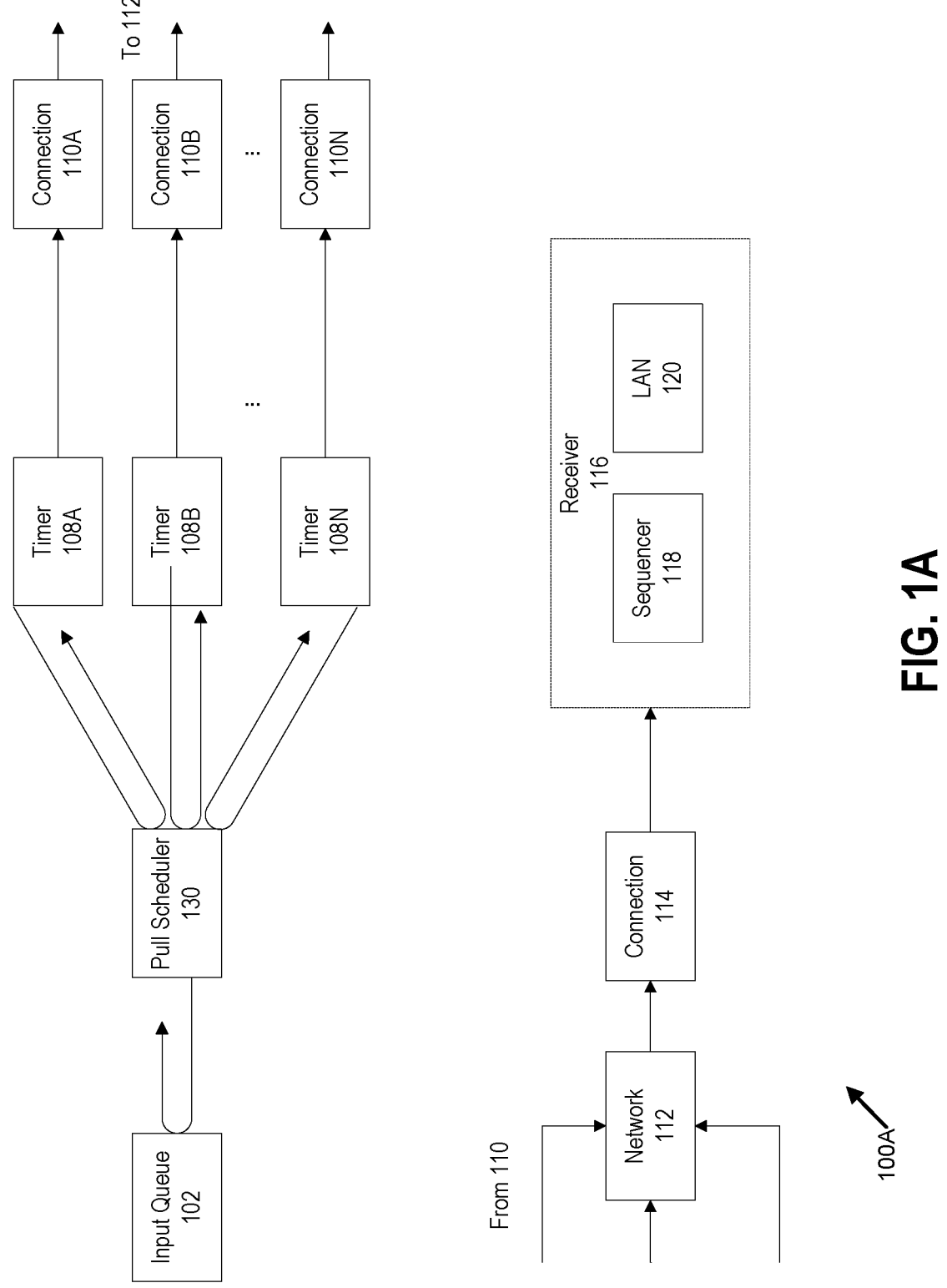
FIG. 1A is a schematic diagram of a pull communication system.

Systems, methods and devices for transmitting data packets where multiple connections for transmission are available, alternatively referred to as a blended router or blended system, are described.

Existing solutions to transmitting data packets via multiple available connections for transmission are typically implemented as "pull" based architectures, wherein data packets are transmitted in response to an event generated or defined by the device or system, such as internal timers associated with the multiple available connections.

The internal timers can be responsive to various connection parameters (e.g., a timer duration configured to reduce the recovery time for retransmitted packets) but not to connection parameters of other available connections.

As a result of the independence of timer events, pull based systems can suffer from underutilization (e.g., where the timer value is too long, resulting in an idle connection), or overutilization (e.g., a less reliable connection may be assigned data packets despite poor performance), which may result in greater latency times in delivering data packets, reduced through put, less reliable data packet delivery, more expensive data packet delivery, and so forth.

Methods, systems and devices are proposed herein which transmit data packets according to a push based architecture to transmit data packets via multiple available connections.

The disclosed methods, systems and devices include a scheduler configured to, in response to a monitored communication event, retrieve a subset of the operating characteristics (monitored characteristics) of each of the multiple connections, and iteratively assign data packets available for transmission to any of the connections determined, based on their monitored characteristics, to have transmission capacity. In example embodiments, other monitored characteristics of the networks may, in conjunction with transmission requirements associated with the data packets, be used to assign data packets to connections matching the transmission requirements of the data packets.

Scheduling data packets with a push based architecture where multiple connections are available has not been used. Typical multipath systems (alternatively referred to as blended connection systems) assign packets and flows to connections on a static basis because they do not take into account flow requirements or the operating characteristics of the connections. For example, a multihomed internet protocol (IP) router assigns packets to connections based purely on the destination IP address in the packet header, matching against its destination routing table. When the connection assignment does not change frequently, it is simpler to implement a pull based architecture. For example, there is no need to handle cases where a large queue of packets have been assigned to a connection by a push scheduler, but now must be recalled or reassigned because the connection has gone offline.

The proposed methods, systems and devices receive data flows, including one or more data packets, from an input network through an input connection.

The proposed methods, systems and devices include a three-stage data pipeline which transmits the data packets over a blended set of connections to a remote peer. New data destined for the multiple connections is passed to a first pipeline stage, where it is queued and subsequently passed to a second pipeline stage associated with each connection of the blended connections. The second pipeline stage compiles statistics on its underlying connection and passes packets to the third pipeline stage. The second stage may provide congestion control functionality and packet buffering to ensure that packets are available for the next pipeline stage. The third stage then writes the packets to the network interface, possibly according to pacing or timing hints provided by the second stage.

Another embodiment may have a single second stage instance which then provides packets to instances of a third stage, each of which manage transmission of packets on a set of network interfaces that share a physical interface card. Other embodiments may exist with different numbers of instances of each of the pipeline stages.

FIG. 1A is a schematic diagram of a pull communication system 100A, according to some example embodiments.

As each connection timer (e.g., timers 108A, 108B, and 108N associated respectively with connections 110A, 110B, and 110N) wakes up, it calls the pull scheduler 130 and requests data packets for transmission from the input queue 102 of data packets. The data packets can be requested in bursts, with a burst size nominally reflecting 20 ms ($\frac{1}{50}$ Hz) worth of bytes at the estimated bitrate of each timer's corresponding connection. A limitation associated with such a pull timer is that the number of bytes requested on each timer wakeup does not reflect the complete congestion window (representing, for example, the "capacity") of the connection.

Since each timer fires independently, the pull scheduler 130 does not have visibility into the overall transmission state to make globally optimal scheduling decisions. For example, connection 110A may be a terrestrial broadband connection and connection 110B may be a bandwidth on demand (BoD) satellite connection. Connection 110A may be preferred over connection 110B as a result of expense, latency, etc., however when the connection 110B timer 108B wakes and calls into the pull scheduler 130, the pull scheduler 130 has no visibility into the next wakeup time of the connection 110A timer 108A (since timer 108A fires independently). The pull scheduler 130 does not have the basis to determine whether connection 110A will be able to handle all of the data packets in the input queue 102, or whether connection 110B should be allocated further data packets to complete the transmission.

If connection 110B does help, pull scheduler 130 may not have means to determine which connection should be used to transmit which of the data packets available for transmission as it only includes visibility into the timers.

The data packets are transmitted across the connections, and subsequently received by a receiver 116 via connection 114. The receiver 116 includes a sequencer 118 to assemble the transmitted data packets, and may further transmit the assembled data packets via a local area network (LAN) 120.

In contrast to the pull based architectures, the proposed system may be able to schedule data packets to specific connections to increase efficient connection utilization.

Figure 1B:
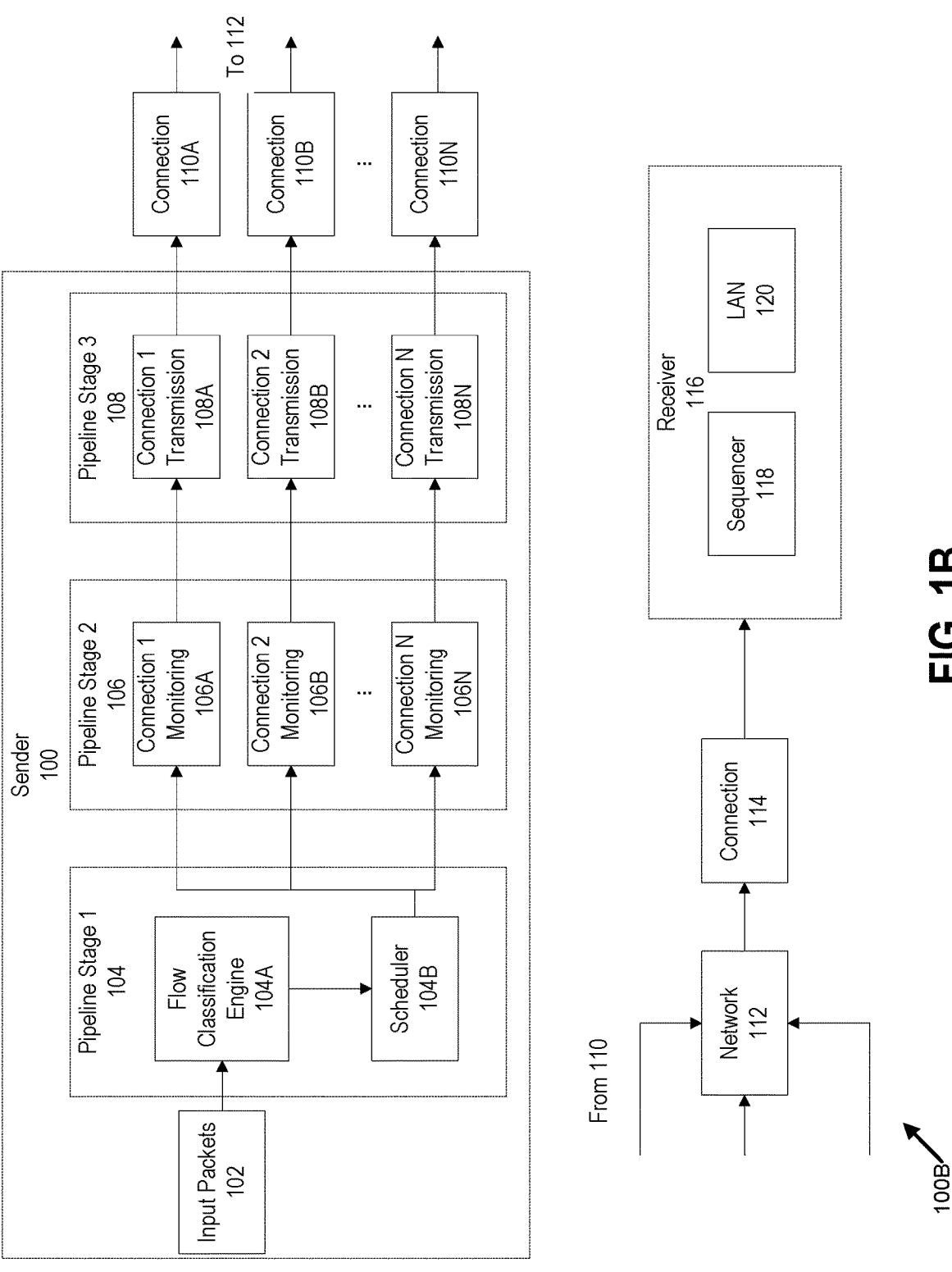
FIG. 1B is a schematic diagram of a push communication system, according to some example embodiments.

FIG. 1B is a schematic diagram of a push communication system 100B, according to some example embodiments. In example embodiments, the system 100B is designed to aggregate connection types that use multiplexing techniques to provide multiple access (MA) to a shared communication channel. For example, orthogonal codes assigned to each node in a Code-Division Multiple Access (CDMA) network allow those nodes to share a set of frequencies and transmit concurrently without interfering with each other.

A property of connection types that use these multiplexing techniques is that reallocation of the available capacity to nodes in the network is quick, typically on the order of tens to hundreds of milliseconds. In example embodiments, the system 100B is designed with this property in mind, reallocating traffic among the available WAN connections on this time scale.

By contrast, connections that use Demand Assigned Multiple Access (DAMA) techniques, also known as Bandwidth on Demand (BoD), share a communication channel by having the nodes negotiate access to the channel for periods of time. Once allocated, the node has dedicated use of the negotiated portion. As such, sharing of the available capacity occurs through the nodes sequentially using negotiated portions of the channel.

With BoD connections, this negotiation and subsequent reallocation of capacity between nodes typically takes on the order of seconds (mid single digits to low double digits) to complete. In example embodiments, the system 100B will require changes (described herein) to make effective use of these types of connections.

The long reallocation time (with associated packet loss and/or latency increases) is interpreted as congestion in the current implementation, and typical congestion control methods, reduce usage on connections where congestion is detected to avoid overloading them. However, BoD connections actually require the opposite behaviour (at least temporarily), in order to request and possibly obtain an increased allocation of capacity.

System 100B includes an input queue 102 receiving data flows, including one or more data packets, from an input network for transmission. Examples of data flows can be file transfers, video file transfers, audio file transfers, voice over internet protocol (VoIP) calls, or data packets associated with a virtual private network (VPN).

The input queue 102 is also responsible for applying a drop policy to packets, in the event that the scheduler (as described herein) is not able to service the input queue 102 at the same rate that new packets arrive from LAN-side clients. This typically occurs if the LAN clients are transmitting at a rate that is higher than the aggregate WAN transmission capacity.

System 100B includes three stages, alternatively referred to as pipelines or pipeline stages, for transmitting data packets over a blended set of connections to a remote peer according to a push based architecture.

The first stage 104 includes a flow classification engine 104A, a scheduler 104B (referred to hereinafter in the alternative as the push scheduler 104) and receives data packets from the input queue 102, and queues the data packets for passing onto the second stage 106. In example embodiments, the first stage 104 includes all of the input queue 102, the flow classification engine 104A, and the scheduler 104B.

The input queue 102 buffers packets received from clients on the LAN-side of the Sender and is responsible for classifying the data packets into flows (alternatively referred to as mapping the data packets into flows), possibly by utilizing or collaborating with a flow classification engine 104A. The input queue 102 ensures that data flows are fairly serviced by the Scheduler of the first stage 104.

In example embodiments, the first stage 104, or its assisting flow classification engine 104A, monitors or is notified of changes to user-configured settings associated with assigning data packets to connections. User-configured settings include information about how connections should be assigned to priority levels, when those priority levels should become active, as well as user-configurable flow classification rules which may cause packets belonging to a flow to prefer connections with certain monitored characteristics (e.g. a packet belonging to a video stream class may prefer a connection with low latency, whereas a packet belonging to a file download class may prefer connections with a lower monetary cost).

The first stage 104 is regularly informed of the current metadata (e.g., operational characteristics) for each of the multiplicity of connection monitoring instances (as described herein) which correspond to the WAN connections comprising the blended link. This metadata is collected by the monitoring instances 106, and may include the estimated bottleneck bandwidth of the connection, the estimated minimum round-trip time, recent actual round-trip times, the current congestion window for the connection, and the receipt/loss status for packets previously sent to the next stage. Using this metadata the first stage 104 may also extend the metadata to track the estimate of bytes it has scheduled as inflight on this connection, and further subdivide that total as new bytes, retransmit bytes, or dummy/probing bytes. All of the metadata collected and tracked by the first stage 104 is referred to as the monitored characteristics.

Using all available monitored characteristics, the first stage 104 will then determine if packets should be sent to the next stage, and if so, which connections should receive the packets. The set of packets provided to a connection monitoring instance may include duplicates of packets previously sent (either to that same connection monitoring instance or to a different connection monitoring instance). Alternately, the Scheduler may determine that a given connection monitoring instance is not currently eligible to receive packets, even if the connection for that instance currently has capacity. The assignment of packets to specific stage-3 instances is discussed elsewhere in this document.

The second stage 106 includes a connection monitoring instance for each connection of the multiple available connections (e.g., connection monitoring instance 106A, 106B, and 106N associated respectively with connections 110A, 110B, and 110N). The connection monitoring instances of the second stage 106 monitor the associated connections and determine or retrieve statistics associated with the performance of the connection (e.g., a latency) called the operating characteristics. The second stage 106 may provide congestion control functionality and packet buffering to ensure that packets are available for the next stage. The second stage 106 passes packets to the third stage 108, which includes an output queue for each connection (e.g., output queues 108A, 108B, and 108N). The third stage 108 writes the packets to the network interface, possibly according to pacing or timing hints provided by the second stage 106.

In some embodiments, the second stage 106 may implement one or more R2RI protocols (e.g. PPPoE (RFC 5578), R2CP, DLEP (RFC 8175)) to better support the bandwidth allocation process for BoD connections.

The second stage 106 is responsible for receiving packets from the first stage 104, queuing them locally, and providing groups of packets as bursts to the next pipeline stage. The second stage 106 also tracks the metadata for its associated connection, based on acknowledgements received from the peer or recipient.

The purpose of the queue in the second stage 106 is to ensure that there are always packets available to the next pipeline stage to write to the network device for transmission. Some embodiments may include priority metadata as part of each packet info, so that new packets which arrive from the first stage 104 may be re-ordered in the queue to provide preference to higher-priority packets.

In order that the second stage 106 has sufficient packets buffered to ensure packets can be provided to the third stage 108, the second stage 106 may provide altered metadata to the first stage 104. For example, according to some example embodiments, the second stage 106 may choose to report a larger congestion window (i.e., "over-advertise") so that the first stage 104 provides additional packets which can be buffered in the second stage 106 for when the third stage 108 completes writing the actual congestion window packets.

The second stage 106 may also provide altered metadata to the first stage 104 in order to facilitate a change in allocation of capacity in a BoD connection (i.e., cause the first stage 104 to schedule packets on this connection as if it had a higher capacity in order to trigger the BoD connection to allocate the higher capacity). This altered metadata may include information that breaks down the higher capacity into different requested types/priorities. For example, the higher incremental capacity used to probe a BoD connection is typically comprised of redundant/dummy packets since the probe packets are likely to be dropped by the BoD connection.

The advertisement or over-advertisement of capacity from the second stage 106 to the first stage 104 does not necessarily need to immediately result in probing for higher incremental capacity. The first stage 104 ultimately still makes the decisions for how packets are assigned to connections. One embodiment might wait until the CWND on all non-BoD connections is fully consumed (or nearing full consumption) before instructing the second stage 106 to kick off the DAMA reallocation process.

The queue in the second stage 106 also enables fast notification of failure to the previous stage if something happens to the underlying network connection. Packets that have been provided to the third stage 108 and written to the network must be assumed to be in transit even if the network interface subsequently reports down, meaning that a timeout must occur before those packets can be marked as lost. However, packets still queued in the second stage 106 can be immediately marked as lost once the second stage 106 is notified that the connection is no longer available, which makes them immediately eligible for prioritized retransmission.

Before being passed to the third stage 108, some embodiments may attempt to explicitly pace the rate of packet transmission by assigning a nominal timestamp to each packet that indicates when the next stage should attempt to send said packet over the connection. Such a timestamp could be determined based on an estimated bottleneck bandwidth of a connection (e.g., a connection to which the packet is being assigned to), and packet sizes in order to prevent network congestion at or before the network bottleneck link.

Figure 2:
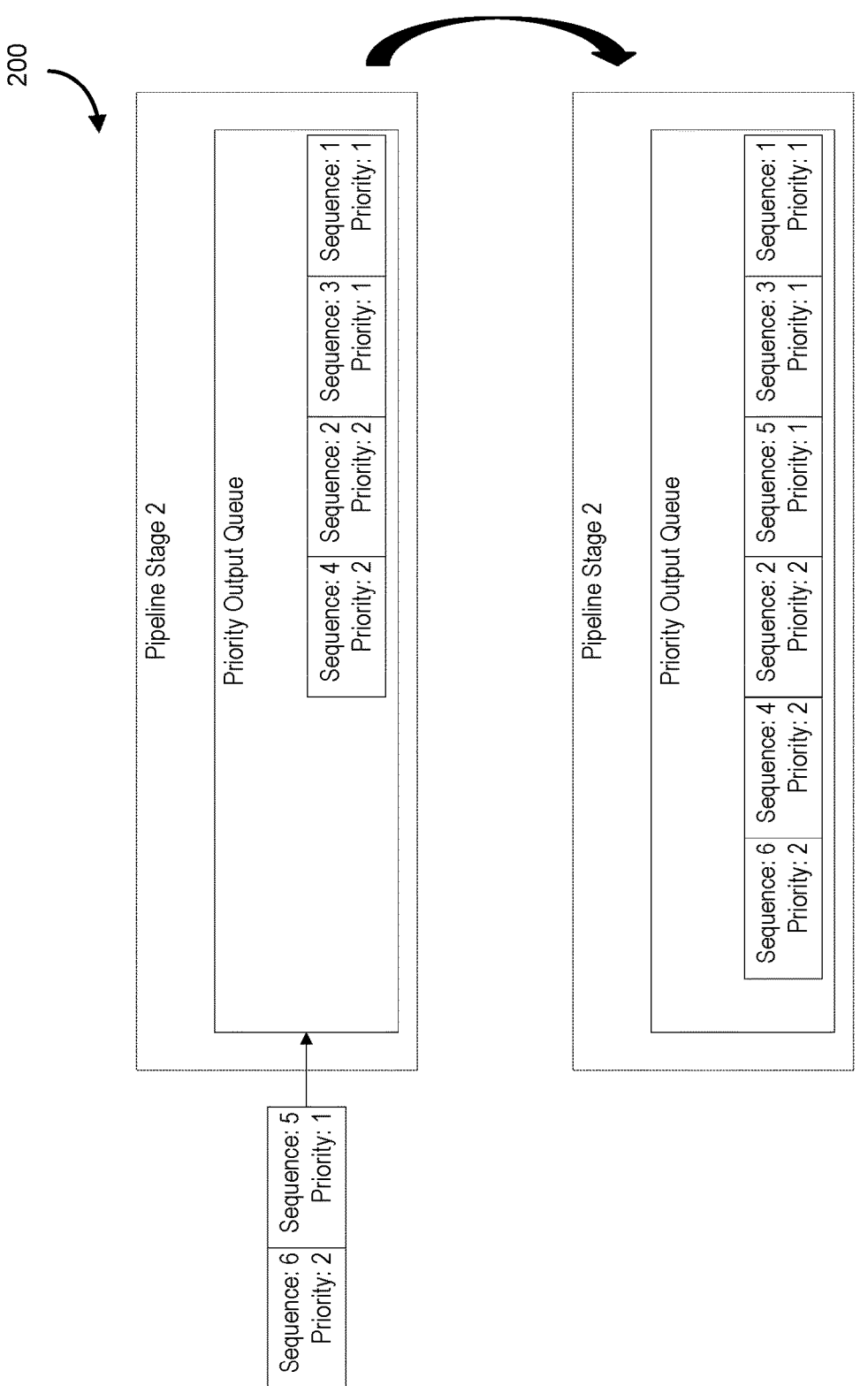
FIG. 2 is a schematic diagram of scheduling data packets of different priority levels, according to some example embodiments.

FIG. 2 at 200 shows an example of an embodiment where the second stage 106 supports prioritized packets. In FIG. 2, the head of the queue appears to the right, and the tail of the queue appears on the left. In the top portion of the FIG. 2, (e.g., a first step), the first stage 104 provides the second stage 106 connection monitoring instance with a new list of prioritized packets. The bottom portion of FIG. 2, (e.g., a second step) shows that these new packets have been added to the priority queue in priority order so that all priority 1 packets will be dequeued before any priority 2 packets are dequeued. Packets at the same priority are kept in sequence order.

In example embodiments, not shown, the second stage 106 may have a single connection monitoring instance which then provides packets to instances of a third stage, each of which manage transmission of packets on a set of network interfaces that share a physical interface card. Other embodiments may exist with different numbers of instances of each of the pipeline stages.

Feedback in the form of metadata or callbacks may be sent from a stage to a previous stage, or a stage may receive notification from a different part of the system. Any of these actions may trigger (i.e., a push) a stage to send packets to the next stage.

The third stage 108 receives packets from the second stage 106 writes them to the network 112 via one or more connection transmission instances (e.g., connection transmission instances 108A, 108B, and 108N associated respectively with connections 110A, 110B, and 110N). In some embodiments all second stage 106 connection monitoring instances provide packets to a single connection transmission instance, or each connection monitoring instance may be associated with a connection transmission instance.

Some embodiments of the third stage 108 may use a queueing mechanism to allow the previous stage to provide hints about when packets should be sent. For example, hints could come in the form of a "nominal send time" associated with the packet as metadata. If the next packet to be sent has a nominal send time that is in the future, the third stage 108 will wait until that time before sending that packet. Urgent packets may be flagged with an immediate timestamp which may cause them to be sent ahead of other queued packets. In order to prevent starvation of non-urgent packets, some embodiments may queue urgent packets after non-urgent packets which have a nominal send time that is in the past.

Some embodiments may include a callback function as part of the packet metadata which can be used to trigger a notification on the second stage 106 to indicate that the packet has been sent. Such a notification may be used to trigger a new batch of packets to be pushed from the second stage 106 into the third stage 108.

Figure 3:
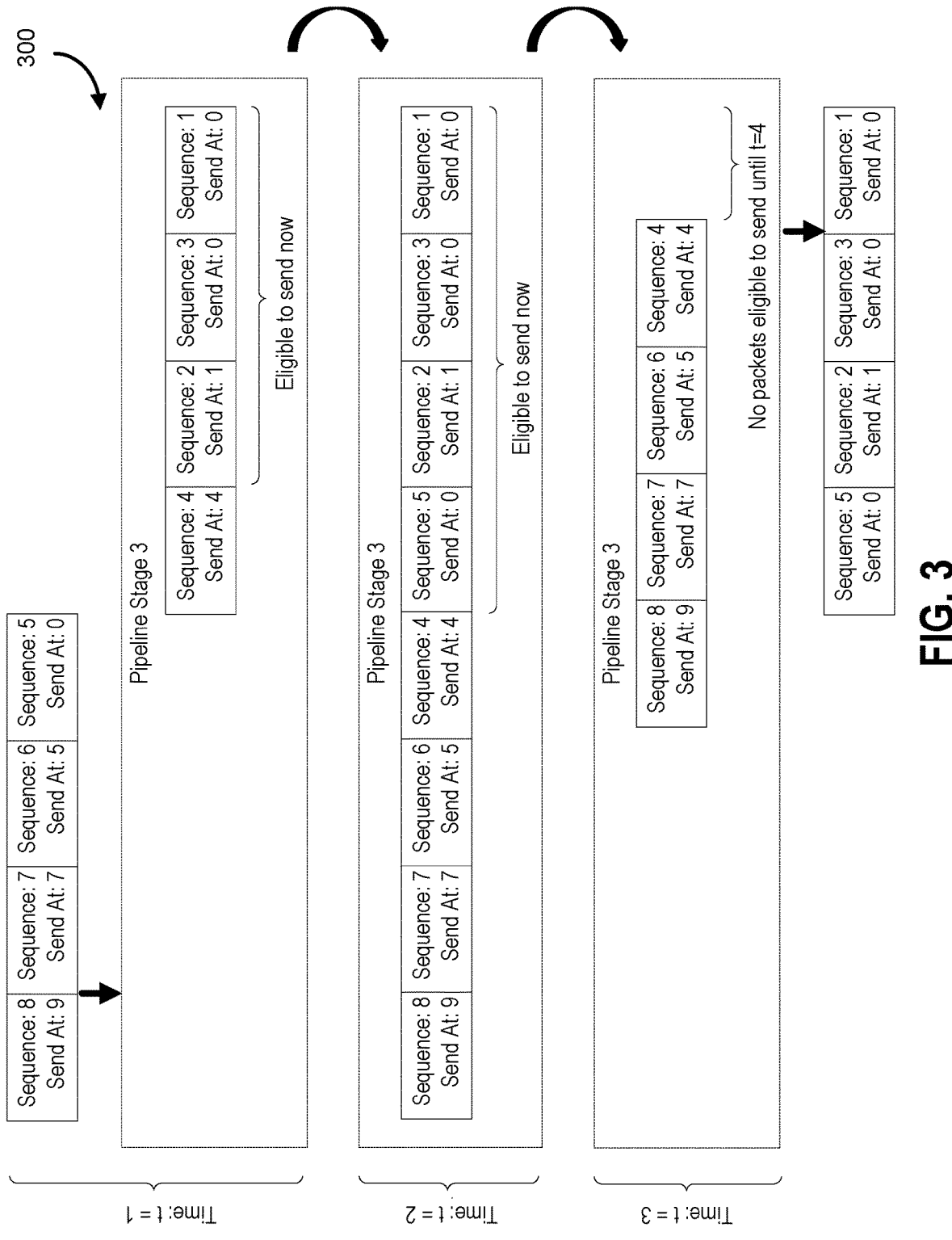
FIG. 3 is a series of schematic diagrams of the push communication system of FIG. 1B, scheduling data packets of different priority levels, according to some example embodiments.

FIG. 3 at 300 shows the progression over time of an embodiment where the packets provided by the second stage 106 contain a "Send At" hint (nominal send time) that requests that they not be sent before the specified time. Packets with a "Send At" time of 0 should be sent as soon as possible. FIG. 3 illustrates an example for all of these cases (e.g. use of a nominal send time in past for urgent packets, and how the system avoids starvation of non-urgent packets).

In the state depicted at t=1, the third stage 108 instance's packet queue contains 4 packets, three of which are currently eligible to be sent, and a second stage 106 instance is providing 4 new packets, the first of which has Seq 5 (sequence order 5) and should be sent immediately.

In the state depicted at t=2, the new packets have been added to the third stage 108 priority queue. Note that this embodiment has chosen to queue the packet with Seq 5 for sending after the packet having Seq 2 because, at the time Seq 5 was queued, Seq 2 was already eligible to send. Freezing the order of packets at the head of the packet queue in this manner prevents starvation where a constant stream of new urgent packets which are to be sent immediately can prevent non-immediate packets from being sent, even though they may have become eligible to send long before the latest immediate send urgent packet arrived.

In the state depicted at t=3, the third stage 108 has dequeued the first four packets from the output queue and has provided them to the network interface. There are currently no packets eligible to send until time t=4, so the third stage 108 instance would need to wait to send more packets until either time advances to t=4, or until new packets arrive that should be sent immediately or at time t=3, even if there is currently write capacity on the network interface.

Packets may be passed from one stage to the next in order at the time that each stage determines is optimal.

Similar to FIG. 1A, the data packets are transmitted across the connections, and subsequently received by a receiver 116 via connection 114. The receiver 116 includes a sequencer 118 to assemble the transmitted data packets, and may further transmit the assembled data packets via a local area network (LAN) 120.

In contrast to system 100A, the push communication system 100B: does not include an independent timer associated with each connection—instead, scheduling of packets onto connections occurs in a centralized location; includes the push scheduler 104 having access to the monitored characteristics of each connection, and includes the push scheduler 104 which is activated in response to one or more monitored events occurring rather than based on a timer. For example, the one or more monitored communication events may include an acknowledgement/negative acknowledgement (ACK/NACK) from the recipient of previously transmitted data packets, or the arrival of new data packets at the input queue 102, and so forth.

In example embodiments, rather than only 20 ms of packets being transmitted, the entire connections (congestion window) CWND can potentially be consumed or allotted by the push scheduler 104.

With access to the monitored characteristics of each connection, the push scheduler 104, may be configured to optimize packet scheduling decisions. For example, data flows with specific transmission requirements can be preferentially assigned to connections able to satisfy the requirements associated with the data flow, rather than be subject to assignment largely based on the wake order of timers. In an illustrative example, a first data flow requires transmissions having less than 50 ms latency.

Connections 110A, 110B and 110N have 5 ms, 45 ms, and 80 ms latency, respectively. With the pull scheduler 130, if the 50 Hz timer for connection 110B (45 ms latency) woke up first, said timer would have been allowed to schedule packets for this first data flow onto connection 110B. With the push scheduler 104, the data flow can be preferentially scheduled on connection 110A (5 ms latency) until connection 110A's CWND is fully consumed before overflowing onto connection 110B (45 ms latency).

To enable bidirectional communication, a single instance of a multipath endpoint can include all components described in FIG. 1B. Specifically it may include one or more instances of Sender 100 to support upstream communication to other multipath endpoints, and one or more instances of Receiver 116 to support downstream communication from other multipath endpoints.

According to some embodiments, for example, one or more of the available connections is a BoD connection, and the push scheduler 104 can cause more data to be allocated to the BoD connection in order to request more capacity from the network, based on criteria such as:

Connection 110A's CWND being fully consumed (or nearing full consumption); while more packets are available at the input queue 102 that are eligible to be transmitted on connection 110B (e.g., based on per-flow rules).

In example embodiments, the push communication system 100B can enable more accurate/fair quality of service (QoS) and Active Queue Management (AQM) packet dropping rules to be applied at the input queue 102. Referring again to the previous example, the flow with the 50 ms latency requirement will never be able to utilize a 80 ms connection. Since the push scheduler 104 has a consistent snapshot of the entire system, it can calculate the flow's fractional usage and fair share of the total capacity excluding the 80 ms connection.

A potential advantage of the push-based scheduling approach is that the full set of metadata for the plurality of connections comprising the blended links are available to the push scheduler 104 in order to optimally assign packets to target connections.

Figure 1C:
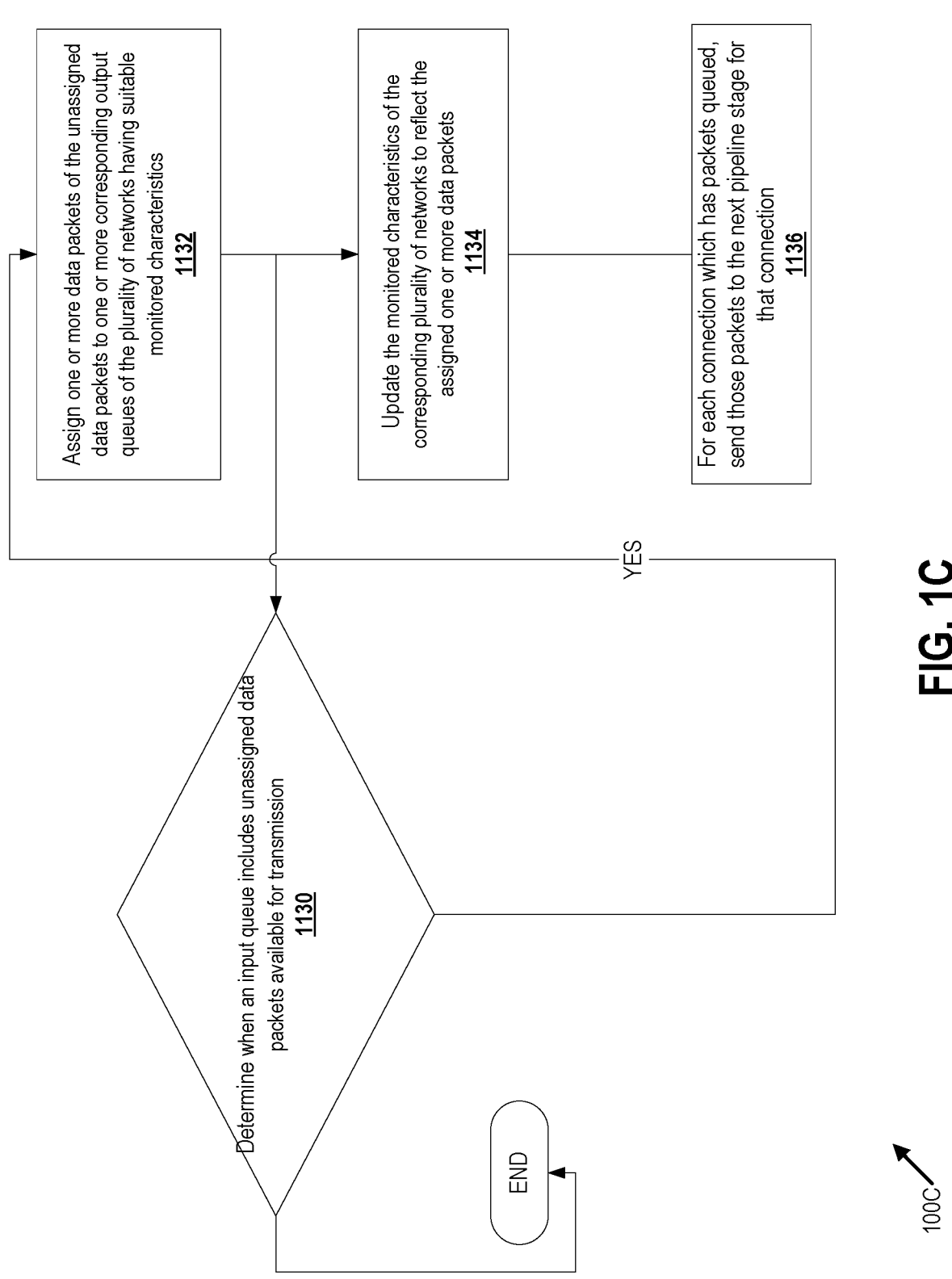
FIG. 1C is a flow chart of a method for transmitting data packets for pushing packets to multiple networks based on availability, according to some example embodiments.

FIG. 1C is a flow chart of a method 110C for transmitting data packets using system 100B or other push communication systems, according to some example embodiments.

At block 1130, the method 100C senses when an input queue includes unassigned data packets available for transmission.

At block 1132 the method 100C includes assigning one or more data packets of the unassigned data packets to one or more corresponding output queues of the plurality of networks having suitable monitored characteristics.

At block 1134 the method 100C includes updating the monitored characteristics of the corresponding plurality of networks to reflect the assigned one or more data packets.

At block 1136 the method 100C communicating the assigned data packets out of the output queues corresponding to each network of the plurality of networks to a destination device.

In example embodiments, a method for transmitting data packets with system 100B includes a loop of the following steps each time the push scheduler 104 is triggered by an external event:

1. Request a data packet from the input queue 102;
2. Assign the received packet to a connection for transmission; and
3. Repeat steps 1 to 2 until there are either: a) No more packets available at the input queue 102; or b) There is no more available transmission capacity (e.g., as defined by the congestion window (CWND) metric) on any of the active connections.

The described method can be implemented such that the push scheduler 104 does not take into account any data flow specific requirements. In such an embodiment, the system 100B, assigns the received packets based on an ordering of the connections.

The ordering can be based on monitored characteristics of the connection, which, for example, may include a subset of the operating characteristics estimated by a congestion control algorithm. In one embodiment, the BBRv1 algorithm is used, but other embodiments could include examples such as BBRv2, TCP Reno, TCP LEDBAT, proprietary implementations to handle specific connection types such as BoD, etc. In the subsequent discussion on operating characteristics specific to BBRv1, reference is made to a pipe analogy, wherein two endpoints are modelled as a series of interconnected pipes, where each pipe segment can have differing diameters and lengths, for illustrative purposes only.

The operating characteristic may be a measure of the minimum time required for a transmitted packet to reach the destination endpoint (e.g., receiver) and get acknowledged (e.g., via an ACK message from the receiver to the sender). This duration is termed the "Round-trip Propagation Delay" (abbreviated to "RtProp"), and is measured in units of time (e.g. milliseconds). In terms of the pipe analogy, this value represents the total length of all pipe segments from the sender to the receiver and back.

The operating characteristic may be maximum rate at which data can move between the endpoints along the pipe segment with the smallest diameter. The smallest pipe diameter, referred to as the "bottleneck" segment, determines the maximum rate at which data can move between the sender and receiver, which is also referred to as the "Bottleneck Bandwidth" (abbreviated as "BtlBw"). For example, an approach used to estimate BtlBw is described in IETF draft: https://tools.ietf.org/html/draft-cheng-iccrg-delivery-rate-estimation-00.

Table 1 shows an example set of WAN connections and their properties, an example subset of operating characteristics chosen by the scheduler 104 to become monitored characteristics, and the resulting sort order:

TABLE 1

| Example WAN connections and their sort order | | | | | |
| --- | --- | --- | --- | --- | --- |
| Connection Operating/Monitored Characteristics | | | | | |
| Interface Name | Administrator/ User Preferred Priority Level | RtProp | BtlBw | Total CWND | Resulting Sort Order |
| wan2 | Primary | 55 ms | 10 Mbps | 69 KB | 1 |
| cell1 | Secondary | 25 ms | 7 Mbps | 22 KB | 2 |
| cell0 | Secondary | 90 ms | 88 Mbps | 990 KB | 3 |
| wan0 | Tertiary | 500 ms | 3 Mbps | 188 KB | 4 |
| wan1 | Tertiary | 500 ms | 700 Kbps | 44 KB | 5 |
| wan3 | Tertiary | 500 ms | 700 Kbps | 44 KB | 6 |

This example method sorts the connections over the following dimensions, moving to the next dimension only if the current dimension compares as equal between the connections:

1. Increasing Preferred Priority Level;
2. Increasing RtProp;
3. Decreasing BtlBw; and
4. Increasing Interface Name.

Note how the result of the sort operation keeps the order of the connections relatively stable, since the sort dimensions are all parameters that are not expected to change frequently.

This stable sort order is intentional, so that packets arriving at the Input Queue will tend to be "sticky" on the same sets of connections (the ones sorted to the top of the list), only "overflowing" onto connections lower in the sort order if the input demand exceeds the total CWND of those sorted higher.

Note how the sort criteria in this example is not flow specific. For example, the Administrator or End User may only want high priority application flows to be transmitted over the metered cell1 and cell0 connections (an example of a transmission requirement), meaning those flows would want a resulting sort order that places cell1 and cell0 lower in the list. Similarly, there may be some flows that have a maximum latency limit, such as a VoIP call where the End User deems it unusable for interactive conversation if the latency exceeds 150 ms. For these flows, it may be desired to have a resulting sort order that uses RtProp as the primary sort dimension. Embodiments that extend the sort criteria to be flow specific will be discussed in subsequent paragraphs.

The Scheduler is also responsible for deciding the retransmission policy of packets. In example embodiments, system 100B is configured so that if a packet is reported as missing by the Receiver, the Scheduler always marks the packet for retransmission. This is desirable for many flows, but others may not want this at all (because the additional latency or the packet potentially arriving out of order makes the packet unusable by the application), or may only want retransmission attempts within a certain time period.

FIG. 1D is a flow chart of another method for transmitting data packets, according to some example embodiments.

One embodiment of a simple scheduling loop is as follows:

1. Perform any necessary accounting for connection metadata updates and determine the set of active connections.
2. Determine a preferred Ordering of connections based on connection metadata (monitored characteristics).
3. While there are packets to send and available network capacity in the set of active connections:
   a. Get the next packet to be sent.
   b. Queue a packet to be sent on the first connection in the Ordering which has available capacity.
   c. Update the connection metadata (monitored characteristics) to reflect the scheduled packet.
   d. Repeat.
4. For each connection which has packets queued, send those packets to the next pipeline stage for that connection.

Such an embodiment treats all packets as being equivalent for the purposes of the preferred ordering of the connection. In this case, the packets can be thought of as belonging to the same class of flow (even though separate packets may belong to logically separate flows, from the Scheduler's perspective, there is no distinction between these flows for the purpose of connection assignment).

FIG. 1E is a flow chart of a further method transmitting data packets, according to some example embodiments.

An embodiment of the scheduler which is able to distinguish between different classes of flow (i.e., ICMP echo request/response vs. video stream vs. file transfer) and even between individual flows within the same class (video stream between hosts A and B vs. video stream between hosts A and C) might be provided as follows.

1. At block 1102, perform any necessary accounting for connection metadata updates (monitored characteristics) and determine the set of active connections.
2. While the active connection set has capacity (block 1114):
   a. At block 1103, construct a Selector based on the currently active connection set.
   b. At block 1105, use the Selector to choose a packet to send over one of the available connections. Exit the loop if no packet is selected.
   c. At block 1107, determine an Ordering of the active connections based on the packet's flow and flow classification in combination with the connection metadata (monitored characteristics).
   d. At block 1110, queue a packet to be sent on the first connection in the Ordering which has available capacity.
   e. At block 1112, update the connection metadata to reflect the scheduled packet.
   f. Repeat.
3. At block 1116, for each connection which has packets queued, send those packets to the next pipeline stage for that connection.

These two sample methods (the methods shown in FIGS. 1D and 1E) are similar, with the method shown in FIG. 1D being a simplified and optimized version of the more general method in FIG. 1E.

The first method could be converted to the second method by defining a single flow class and defining a selector that matches all packets. Given this, the second method (FIG. 1E) will be discussed in more detail, and the same discussion will be applicable to the first method (FIG. 1D), subject to the limitations noted above.

The first step is to update any pending metadata accounting (monitored characteristics) in order to determine the set of active connections. In one embodiment, the set of active connections are the connections which are not subject to unreliable connection backoff (i.e., connections whose usage is being restricted because of recent failures to reliably deliver packets).

Other embodiments may further restrict the set of active connections by, say, eliminating connections whose metadata (monitored characteristics) do not match any of the currently defined flow class requirements (i.e. assuming all packets must match one defined flow class then if a connection would never be selected by any flow class then it could be considered inactive; for example, if all flow classes specified a maximum RTT of 500 ms, connections with RTT>500 ms could be considered inactive).

The set of active connections has capacity to send packets if at least one connection in the set has available CWND (congestion window), meaning that the number of inflight bytes currently tracked by the Scheduler for this connection does not exceed the CWND that has been determined for this connection. In one embodiment, the CWND for the connection may be the CWND as reported by the next pipeline stage, or the Scheduler may choose to reduce the reported CWND if throttling or priority routing are in effect.

In one embodiment, a connection that is being throttled to a certain rate has its CWND reduced by the same factor as the throttle rate over the bottleneck bandwidth (or the CWND is unchanged if the throttle rate is higher than the bandwidth estimate). Similarly, a connection's CWND may be reduced if it is subject to priority routing (where the embodiment supports connection grouping into priority levels which are activated when total goodput (throughput excluding overhead) of all connections in higher-priority levels drops below the configured threshold for the level to be activated). Various methods for determining the CWND reduction in these scenarios will be described subsequently in relation to FIGS. 8 and 9.

Connections assigned to priority levels which are inactive (the total goodput plus unused bitrates for all connections in higher priority levels meets or exceeds the activation bitrate for the priority level) have an effective CWND of zero, and connections in priority levels which are non-primary have their CWND set to zero if the estimated total goodput bitrate of all connections in the currently active set of priority levels meets or exceeds the activation threshold for the lowest active priority.

In other embodiments using priority routing, connections in the non-primary levels can be capped at a rate lower than their bottleneck bandwidth, such that they only contribute enough to close the gap to the configured activation threshold. This can be done, for example, for cost saving, when the non-primary connections are more expensive connections meant to be used only during emergencies. Similar to throttling, the CWND is reduced to reflect the capped rate these connections should be sending at.

The loop in step 2 of the method can execute so long as a connection in the active set has capacity.

Step 2a (block 1103) constructs a Selector to be used to find packets which are eligible to be sent on one of the active connections with active capacity. In some embodiments, a Selector consists of the set of flow classes which are compatible with the current set of active connections with capacity.

For example, if a flow class requires a connection to have a maximum latency of 500 ms, and the active connections with available capacity all have latencies above 500 ms, then that flow class would be excluded from the Selector. Some embodiments may choose to include flow classes in the Selector that would not normally match the criteria for the active connections with capacity if the embodiment can determine that there is currently no connection (active or inactive, with or without available capacity) that meets the criteria for such a packet. In that case, the embodiment may choose to violate the match criteria in favour of sending the packet rather than holding the packet until it times out and is dropped. Other embodiments may choose to enforce a strict matching policy where packets matching flow classes which have no eligible connections are never sent.

Figure 1F:
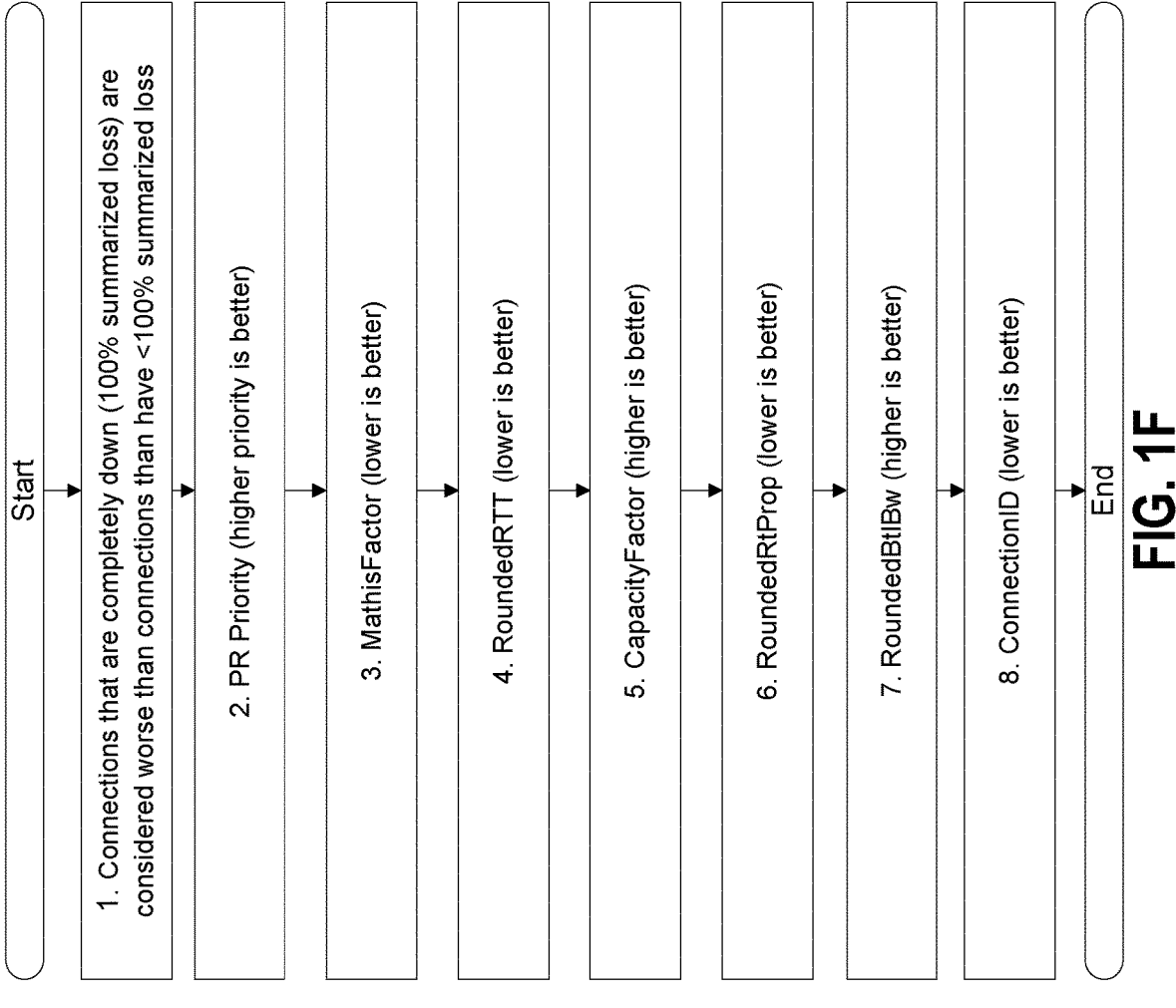
FIG. 1F is a process flow illustrating the dimensions used to sort network connections for controlling the routing of data packets, according to some example embodiments.

In another embodiment, shown in an example sort order in process flow of FIG. 1F, an alternate approach can be utilized for computationally determining or establishing the sort order for controlling the routing of data packets to the various network connections.

Some or all of the input parameters can be rounded/bucketed before being used in the sort order determinations. The technical improvement from rounding and bucketing is to keep the sort order as "stable" as possible so that changes in sort order are not constantly occurring (e.g., without the rounding and bucketing, two close values may cause "jitter" by having the sort change continuously as their values fluctuate over time.

The factors that influence its decisions include: keeping the sort order as "stable" as possible, so that packets do not get unnecessarily split over multiple WAN connections (splitting increases the chances for self-induced out-of-order and jitter events); and taking into account both measured properties of the connection, and external directives that are not measured.

Values for rounding can include the following:

Latency-related values (RtProp, RTT) are rounded to the nearest multiple of 50 ms, subject to a floor of 1 ms after rounding.

Throughput-related values (BtlBw) are rounded to the "nearest order of magnitude".

Packet loss (worst value over the 3 sliding windows) is rounded to the nearest order of magnitude. Note that the raw values here are limited to the range [0,100], so the output values are limited to the set (0, 1, 2, 3, 4, 5, 6, 7, 8, 9, 10, 20, 30, 40, 50, 60, 70, 80, 90, 100).

An example of rounding to the nearest order of magnitude is provided in the below table. The raw value is shown, its computed order of magnitude, then the resulting rounded value.

| Raw Value (Range) | Order of Magnitude | Rounded Value |
| --- | --- | --- |
| 0 | 1 | 0 |
| 1 | 1 | 1 |
| 2 | 1 | 2 |
| 10-14 | 10 | 10 |
| 15-24 | 10 | 20 |
| 85000-94999 | 10000 | 90000 |
| 95000-99999 | 10000 | 100000 |
| 100000-149999 | 100000 | 100000 |
| 150000-200000 | 100000 | 200000 |

A specific improvement based on improving a networking routing order for controlling the use of network interfaces is described in some embodiments wherein a composite property for round-trip time (RTT) and packet loss is utilized to predict throughput based upon the Mathis Equation for establishing an upper bound for TCP throughput given RTT, packet loss, and MSS. The Mathis factor can be utilized to modify the sort order for routing networked packets.

Measured properties can include: packet loss over 3 separate sliding windows (500 ms, 3 s, 30 s), which is further summarized as the worst value over the three windows; current network round trip time (RTT); bandwidth round trip propagation time (BBRv1) parameters: RtProp (network propagation delay); and BtlBw (throughput estimate). External directives, can include priority (PR) rules, among others, but can also include flow-specific rules/requirements.

In some embodiments, the BBRv1 measured properties differ from their design in the original BBRv1 IETF draft. For example, to consider embodiments that might run on systems that are less consistent in their execution time, the size of the sliding window used to compute BtlBw may be increased to cover a long duration of time (hiding the variability due to execution inconsistency), but the window duration may also be immediately shortened if network loss or latency increase events occur, since those indicate that the BtlBw may have actually changed and any long history in the sliding window must be forgotten.

For similar execution inconsistency reasons, the input parameters used to measure RtProp may be changed to include more than the network propagation delay, adding portions of the execution/processing time, since that time can be non-trivial, and consistently contributes to the actual delay experienced when transmitting packets and waiting for a response. In some embodiments, this is referred to as "System RtProp", as opposed to "Network RtProp" which only consists of the network propagation delay. In these embodiments, "System RtProp" and "Network RtProp" may be used for varying computations, depending on the intended purpose. For example, in calculating CWND, "System RtProp" is appropriate, so that the pipeline contains enough data inflight to account for processing delays. However, when sorting network connections for determining packet routing, "Network RtProp" is more appropriate, since the preferred routing decision is independent of system execution delay.

Packet loss, latency, and throughput are not completely independent variables. The three of them combined influence each other depending on the application's congestion control behaviour. This is because for example, with TCP, higher packet loss results in longer periods of over-the-air "silence" (underutilized channel) as the sender waits for DUP ACKs or RTOs to occur.

As such, some composite properties are determined and used in the final sort approach. Specifically:

Mathis Factor: This composite property takes into account RTT and packet loss to predict throughput, and is based on the Mathis Relation that gives an upper bound for TCP throughput given RTT, packet loss, and MSS. When comparing the properties of any two network connections to determine their sort order, MSS can be considered a constant, so this relation indicates that expected throughput is proportional to the inverse of (RTT*sqrt(PacketLoss)). The relation is utilized in this example as a practical implementation to establish a factor that is utilized in directly controlling the operation of a network controller or a router. For each connection, the system determines the MathisFactor as: MAX(RoundedRtt,1 ms)*sqrt(RoundedSummarizedPacket-Loss). Connections with smaller MathisFactor values are considered better. The calculation is a function of two independently measured properties, so the relationship between them determines how connections will compare to each other. The Mathis Factor can be maintained and stored in a data object, such as a corresponding Mathis Factor data value associated with each connection, and stored, for example, in an array of data values alongside other monitored characteristics.

For example, at one extreme, two connections with 0% packet loss will always have the same MathisFactor—their actual RTT values do not matter. In this scenario the MathisFactor does not influence the sort order—it will be determined through comparison of subsequent measured and composite properties.

At the other extreme, if two connections have 100% packet loss (RoundedSummarizedPacketLoss=1.0), only their RoundedRtt values will determine how they compare to each other. In some embodiments, this is not desirable, so connections with 100% packet loss are filtered from the available choices at an earlier stage.

Between the two extremes, connections with both low RTT and low packet loss will compare better than those with higher values. However, a connection with high percentage loss can still compensate by having a low RTT and have a same Mathis Factor as a connection with a low percentage loss. For example:

Connection A: 100 ms RTT, 0.01 (1%) loss=>MathisFactor=10
Connection B: 19 ms RTT, 0.25 (25%) loss=>MathisFactor=9.5

In this example, even though Connection B has significantly higher loss (25% vs 1%), its lower RTT compensates and causes it to compare with a better MathisFactor than Connection A. The explanation for this is that Connection B's lower RTT allows it to exchange packet acknowledgements (positive and negative) for the lost packets, and complete any necessary packet retransmissions faster than Connection A can with its higher RTT, even though it has a smaller percentage loss.

Capacity Factor: This composite property takes into account BtlBw and RtProp and is determined as: RoundedBtlBw/MAX(RoundedRtProp,1 ms). The units are "bytes per second per millisecond", which has no physical meaning, but provides a way to normalize the bandwidth that the connection can achieve per unit of RtProp. In other words, a connection that is able to achieve more bandwidth per millisecond of its RtProp is considered more efficient than one that achieves less. Efficient transmission in this context means a connection that achieves more bandwidth per millisecond of propagation delay (RtProp).

Once all of the raw inputs have been processed and composite properties calculated as described above, the actual sort mechanism can execute serially as follows:

Moving from one comparison to the next only occurs if all of the previous lines compare as equal. If a comparison is unequal, the remainder of the comparisons are irrelevant and are skipped. The choice of comparison, in some embodiments, is conducted on a flow classification basis (e.g., VPN vs. VoiP vs. ping packets vs. FEC packets), and for each different flow, the comparison criterion list could be different (e.g. each could have different pre-defined most important characteristic, second most important characteristic, third most important characteristic, and so on). Each of these characteristics can be iterated through from most important and so on, until the connections themselves can be sorted and put into an order sequence. In some embodiments, depending on flow classification, a first pre-step is to select a subset of connections that are suitable for sending the type of data packet in the flow classification, and then an order is imparted to them before packet assignment is carried out.

1. Connections that are completely down (100% summarized loss) are considered worse than connections than have <100% summarized loss.
2. PR Priority (higher priority is better)
3. MathisFactor (lower is better)
4. RoundedRTT (lower is better)
5. CapacityFactor (higher is better)
6. RoundedRtProp (lower is better)
7. RoundedBtlBw (higher is better)
8. ConnectionID (lower is better)

A rendering of the sort mechanism is shown in FIG. 1F. In an example sort mechanism, a real-time flow includes a comparison of RTT/RtProp first, and then of equal, it would then compare reliability, and then if also equal, then compare transmission rate, etc. Depending on a flow type, there may be different sort orders. For example, a flow that wants throughput might compare transmission rate first. If equal, then compare at reliability. If also equal, it might decide to assess nothing else and then simply choose arbitrarily.

In some embodiments, flow requirements (e.g., real-time vs throughput) can dictate the order and number of comparisons. For example, a real-time flow might prefer to compare RoundedRTT and RoundedRtProp only, ignoring all other properties. A throughput flow may decide to only compare the MathisFactor and CapacityFactor.

The above described approach relates to explicit sort dimensions. There are also implicit sort dimensions that tend to occur as a by-product of typical application traffic patterns.

Most application traffic tends to be bursty or adaptive, so it does not require the use of all WAN connections. This means that the connections that are currently at the bottom of the sort order may not have traffic transmitted on them. If they don't, their explicit sort dimensions don't get updated, so they tend to maintain their position near the bottom of the sort order.

In some embodiments, over a period of time, the push scheduling can also be configured to implicitly cause a sort order along one or more implicit sort dimensions. The implicit sort dimension forces the connections that have experienced periodic bad events (e.g. latency spikes due to congestion) to bubble to the bottom of the list. The connections that are consistent in their behaviour naturally bubble to, and remain near the top.

This is generally considered a good property of the algorithm, but may be modified in the future to be influenced by external factors. For example, if a flow has specific requirements that cannot be satisfied by the connections currently near the top of the sort order, it may make sense to generate probing traffic on the connections near the bottom to refresh their explicit sort dimensions.

Figure 4A:
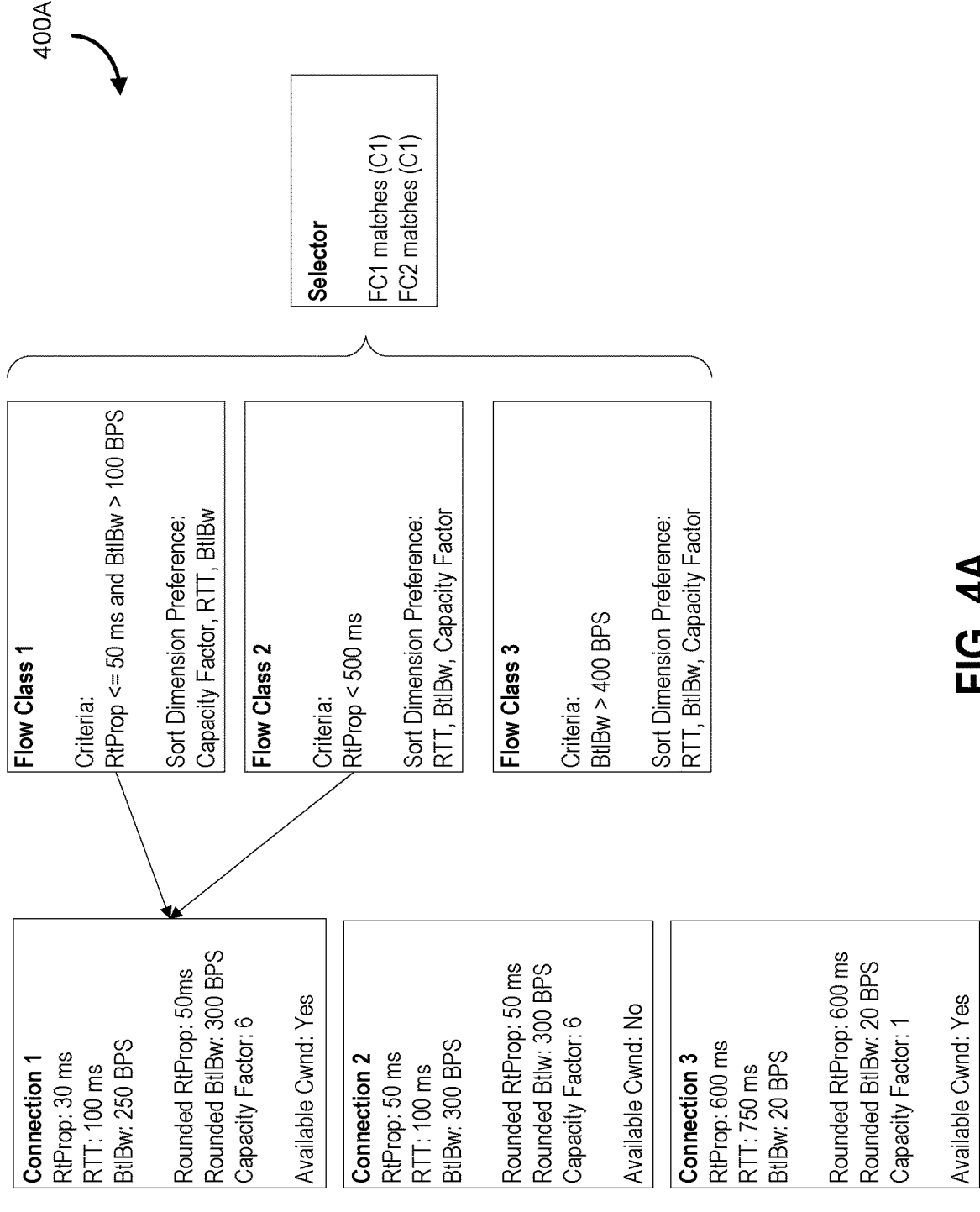
FIG. 4A is a schematic diagram of connection selection with the push communication system of FIG. 1B, according to some example embodiments.

FIG. 4A at 400A depicts an embodiment where a selector is generated using the predefined Flow Classes and the current Connection states.

In this example, there are 3 Connections each having a set of monitored characteristics, and there are 3 predefined Flow Classes each of which defines a match criteria and a preference for sorting the connections that meet the match criteria.

In this embodiment, the Selector consists of the set of Flow Classes whose match criteria match at least one connection with available capacity. In this example, Flow Class 1 and Flow Class 2 both have match criteria that match Connection 1 and Connection 2, while Flow Class 3 matches no connections and is not included in the Selector.

Even though both Connection 1 and Connection 2 are matched, Connection 2 is excluded from the Selector because it has no available congestion window and cannot currently send a packet. In constructing the Selector, a Flow Class can be included as soon as a matching Connection with available congestion window can be found, so an embodiment may only examine Connection 1 to determine that Flow Class 1 and Flow Class 2 can be included in the Selector, without having to check that Connection 2 matches.

Step 2b (block 1105) uses the Selector from step 2a to find a packet on the retransmit queue or the send queue which is eligible to be (re)sent on an active connection with capacity. If no such packet can be found, then the loop exits. It is possible for this to occur even if some active connection has capacity and there exist packets on the input or retransmit queues.

Figure 4B:
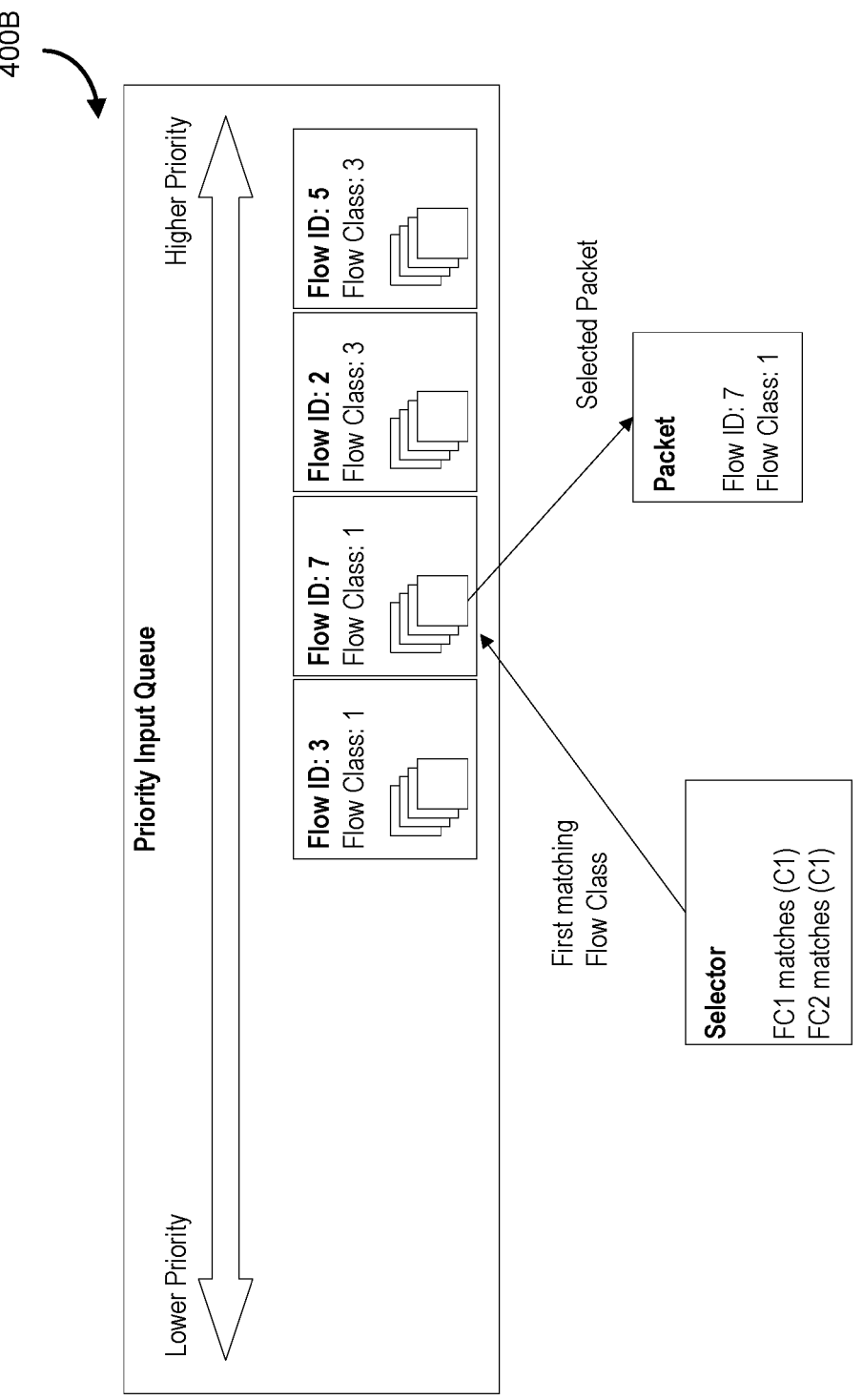
FIG. 4B is a schematic diagram of data packet selection with the push communication system of FIG. 1B, according to some example embodiments.

FIG. 4B at 400B shows an embodiment with a priority input queue which is an ordered set of Flows, where Flows on the right side of the queue should send packets before Flows on the left side. Each Flow has a Flow ID, and each Flow belongs to one of the predefined Flow Classes. Each Flow also contains an ordered queue of Packets, such that if the Flow is chosen, then the packet at the head of the queue is removed.

In this example, the Selector from FIG. 4A is used to evaluate the Flows in the input queue from right to left, and it chooses the first Flow having a Flow Class that is listed in the Selector. In this case Flows with ID 5 and 2 are evaluated and rejected because they both have Flow Class 3, which is not one of the Flow Classes from the Selector. Flow 7 is then evaluated and is a match because it belongs to Flow Class 1, which is one of the Flow Classes in the Selector. A packet is then extracted from the head of Flow 7's packet queue and is stamped with the Flow metadata.

Once a packet has been selected, step 2c (block 1105) constructs an Ordering of the active connections. The Ordering chosen will be based on rules provided in the definition of the flow class, if the embodiment supports that, or on a generally acceptable ordering otherwise. Some embodiments may use the same ordering for all flows matching a flow class, and some embodiments may make the ordering flow-dependent (for example, to make all packets in flow sticky to a given connection, without requiring that all flows be sticky to the same connection). Orderings may be constructed as necessary on each iteration of the loop in step 2, or some embodiments may choose to cache the Ordering and clear the cache if the criteria used to construct the ordering has changed (i.e. on a metadata update).

One embodiment constructs the Ordering ignoring whether or not a connection currently has capacity, since capacity may be reduced to zero by scheduling packets on the connection, or increased above a current value of zero if scheduling a packet on a different connection happens to change the metadata mix sufficiently to activate a set of connections in a previously unused priority level. Constructing the Ordering in this manner allows it to be cached and reused if the only items that change are the effective CWND and inflight byte counts for the connections.

A flow which traverses system 100B tends to behave better when the packets for that flow traverse the same WAN connection whenever possible. As such, an embodiment should construct an Ordering using stable sort criteria so that Orderings created for the same flow are consistent unless the monitored characteristics of one or more of the connections has changed significantly. Thus, operating characteristics such as RTT and RtProp, and bandwidth are poor choices because they may fluctuate over short periods of time, making the sort order unstable.

Conversion from "noisy" raw operating characteristics to monitored characteristics can occur using statistical filtering methods. They can range from traditional measures such as mean, variance, and ANOVA, to the field of (quantized) rank order statistics (rank order filtering). For example, the monitored characteristics may be ranges of the raw operating characteristics, which ranges may be defined by a specific value (e.g., 1-100 ms), or an order of magnitude, and so forth. Specific examples follow in subsequent paragraphs, including the example shown in Table 2.

Some embodiments could use machine learning techniques to convert from operating to monitored characteristics. For example, a trained model could be developed to predict imminent failure of a connection, and as a result construct an Ordering that sorts matching connections to the end of the list. Another example model could be used to detect the type of connection (e.g. wired, cellular, WiFi, satellite, BoD, etc.), and use that to form the basis for a new monitored statistic (e.g. susceptibility to buffer bloat) that that cannot be easily measured in real time.

One embodiment uses the following Ordering for all packets (later criteria are used only if all previous criteria are equal):

"Bucketed" drop probability. Connections can be grouped in buckets defined by ranges of packet count-based or size-based (e.g. in bytes) drop probability. Connections in a bucket with a smaller drop probability range appear first in the ordering, and connections in a bucket with a larger drop probability range appear later in the ordering.

Connection priority group (as provided by the Administrator or End User). Higher priority connections are ranked earlier (primary>secondary>tertiary, etc.)

"Bucketed" RTT. Latency rounded to the nearest multiple of 50 ms. Bucketing of the latency value allows normal variation in latency to be hidden from the ordering, while still allowing a significant change in latency to be reflected in the Ordering.

"Capacity Factor". This is an aggregate value which is measured in "bytes per second per millisecond" and is calculated by rounding the bottleneck bandwidth estimate to the nearest order of magnitude or integer multiple of the nearest order of magnitude (for example, 1 rounds to 1, 10 and 11 round to 10, 15 rounds to 20, 86000 rounds to 90000) and dividing it by the RtProp bucketed to the nearest 50 ms. Connections which achieve a higher bandwidth per ms of RtProp are considered to be better than connections with lower bandwidth per ms of RtProp.

Determining the capacity factor on the raw BtlBW and RtProp values is highly variable, but stabilizing it by rounding BtlBW to the nearest order of magnitude or integer multiple of the nearest order of magnitude and bucketing the RtProp stabilizes the value over time unless large changes are observed. Table 2 shows several examples of bucketing, rounding and Capacity Factor calculations. Note that in this embodiment, the Capacity Factor is rounded to the nearest integer, and for the purposes of the Capacity Factor calculation, bucketed RtProp values of 0 are treated as 1.

"Bucketed" RtProp. Lower values of RtProp bucketed to the nearest 50 ms are preferred over higher values.

"Rounded" BtlBW. Higher values of BtlBW rounded to the nearest order of magnitude or integer multiple of the nearest order of magnitude are preferred over lower values.

If all of the aforementioned criteria compare as equal, Connection IDs (assigned at the time connections are enumerated) are used to break ties deterministically. Other embodiments could use more complicated tie breaking mechanisms, for example, hashing properties of the flow to an integer modulo the number of tied connections.

TABLE 2

| | | | | |
|---|---|---|---|---|
| Bucketing, Order of Magnitude Rounding, and Capacity Factor example | | | | |
| Raw RtProp | Bucketed RtProp | Raw BtlBW | Order of Magnitude Rounded BtlBW | Capacity Factor |
| 0 | 0 | 0 | 0 | 0 |
| 24 | 0 | 2 | 2 | 2 |
| 25 | 50 | 13 | 10 | 0 |
| 83 | 100 | 17 | 20 | 1 |
| 114 | 100 | 9400 | 9000 | 90 |
| 240 | 250 | 9800 | 10000 | 40 |
| 270 | 250 | 13500 | 10000 | 40 |
| 272 | 250 | 17850 | 20000 | 80 |

An embodiment which distinguishes between flow types may for example, modify the above ordering to prefer high capacity factor connections over lower latency connections for file transfer flows, and lower latency connections over high-bandwidth connections for video streams, depending on the transmission requirements of the flow type.

An embodiment which performs strict flow pinning to a connection (or set of connections) may choose to only allow an exact match on connection ID (possibly excluding other connections entirely from the Ordering). Such pinning rules are typically provided by an Administrator or End User and are intended to override all Ordering decisions determined by monitored characteristics. As such, even if the monitored characteristics indicate that a connection is unusable or has failed, the flow will continue with the same Ordering and will thus no longer have connectivity through the multipath system 100B.

Some embodiments could create monitored characteristics that are a composite of other monitored or operating characteristics, using these composites to determine an Ordering. For example, a composite reliability metric could be created that combines bucketed drop probability, (running) latency (RtProp) variance and (running) throughput into a weighed metric that represents overall reliability for a connection. Connections that rank high on this metric would be reserved for flows that require high reliability (which may not mean high speed).

In general, if a Selector is generated that allows a packet to be chosen, then that packet should generate an Ordering that allows the packet to be scheduled on some connection that was used to generate the Selector.

Figure 4C:
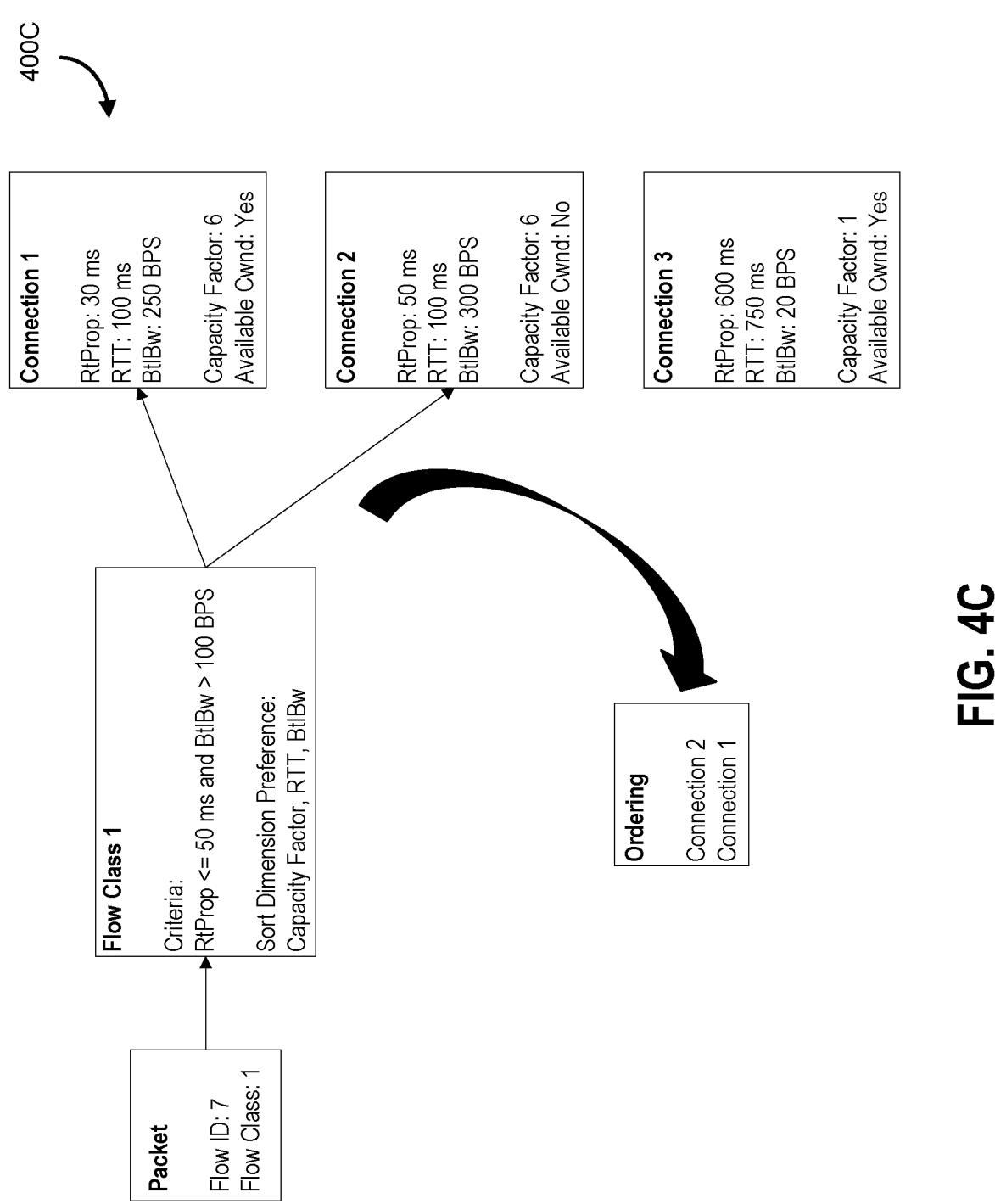
FIG. 4C is a schematic diagram of data packet assignment with the push communication system of FIG. 1B, according to some example embodiments.

FIG. 4C at 400C shows an example of how a Packet's Flow Class can be used to construct an Ordering of Connections. In the depicted embodiment, the Flow Class in the Packet's metadata is used to look up the Flow Class definition. The match criteria of the Flow Classes are used to choose which connections should be included in the constructed Ordering (alternatively stated, the Flow Class defines a set of transmission requirements which may be associated with the particular flow class), in this case Connection 1 and Connection 2 both match, while Connection 3 does not. Note that Connection 2 is included despite it having no available congestion window (i.e., it is currently ineligible to send packets). This facilitates caching the Ordering and allowing it to be reused even if the state of the available congestion window should change (for example if the Scheduler is initially preventing sending on the connection because it has a lower priority, but then decides to re-enable the connection because the current mix of data on the enabled connections does not meet minimum system throughput).

Once the set of Connections has been chosen, the ordering criteria from the Flow Class (e.g., a subset of transmission requirements associated with the flow class) is used to sort the matched Connections into an ordered list. In this example the first criterion is the Capacity Factor. Both Connections have the same Capacity Factor. The second criterion is the RTT, and both Connections have the same RTT. The third criterion is the BtlBW (bottleneck bandwidth), and Connection 2 has a higher value, so appears before Connection 1 in the Ordering.

The set of ordering criteria in the Flow Class (e.g., the transmission requirements) allows packets to be scheduled on available connections which are most optimal for the types of flows to which they belong. For instance, packets belonging to a "video encoder" flow class can preferentially use connections having the lowest latency, while packets belonging to a "file transfer" flow may prefer high-throughput connections even if the latency is high or highly variable.

Once an Ordering has been determined for a connection, step 2d (block 1107) uses the Ordering to assign the packet to a connection with available bandwidth. The packet is placed on a send queue for the connection.

Figure 4D:
FIG. 4D is a schematic diagram of another data packet assignment with the push communication system of FIG. 1B, according to some example embodiments.
Figure 4D:
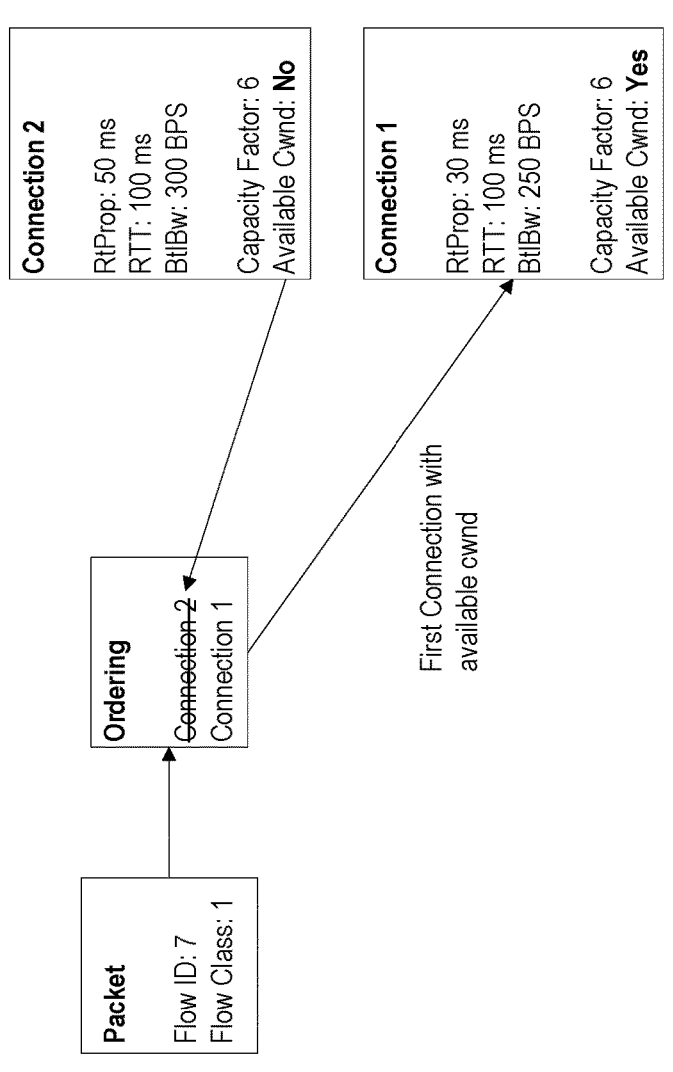

FIG. 4D at 400D shows the Ordering from FIG. 4C being used to choose a connection for the given Packet. In this example, the first connection in the ordering is Connection 2, but it has no available congestion window, so it is not currently eligible to send a packet. Connection 1 is then checked and is able to send a packet, so it is selected and the packet is queued to send to the Stage 3 pipeline for Connection 1.

Connection metadata (monitored characteristics) for inflight bytes is then adjusted as part of step 2e. In some embodiments this includes distinguishing between goodput bytes and retransmit/dummy/probing bytes when tracking CWND consumption for the connection. Such an adjustment may affect the goodput and/or potential goodput for a priority group which may cause connections in the next priority level to be activated in the next iteration of the loop in step 2. Various methods for conversion from units of volume (CWND bytes) to rate (goodput) are discussed subsequently in the descriptions for FIGS. 8 and 9.

Once step 3 has been reached, either the available CWND for each connection has been filled, or there are no more packets eligible for transmission. The packets queued to the per-connection output queues in step 2 are then sent to the appropriate instances of the next stage of the pipeline.

In some embodiments, an explicit goal function can be used to determine the desired trade off when there are multiple Flows with the same priority, but belong to Flow Classes with conflicting requirements.

The embodiment described in FIG. 4A-4D shows a goal function that implements fairness between the flows at the same priority. The Selector services each of the flows that match its Flow Classes in a round-robin manner.

The fair implementation in this embodiment uses the Deficit Round Robin scheduling algorithm described in RFC 8290. A brief summary of this algorithm is that it utilizes a "byte credit" scheme, assigning a quantum of byte credits to each queue in each round of its iteration over the queues.

The number of bytes that can be retrieved for transmission from each queue in each round is nominally limited to the number of credits it has available. When the byte credit quantum is equal for each queue, fairness naturally occurs.

In some embodiments, the goal function might allow intentional unfairness to be configured by an Administrator or End User. For example, a weight could be configured on a matching flow, which could ultimately result in unequal byte credit quantums given to the queues on each iteration.

For example, there might be 5 different weight levels:
Highest (5)
High (4)
Normal (3)
Low (2)
Lowest (1)

The value assigned to each weight would represent the ratio between their byte credit quantums. For example, if the quantum corresponding to Normal is 30 KB, a flow marked as Low would receive a quantum of (2/3)*30 KB=20 KB in each round. A flow marked at Highest would receive (5/3) *30 KB=50 KB.

Note that the absolute numbers in this example are not significant. If the Normal quantum was 5 KB instead of 30 KB, the weights would still scale the relative quantums for the other priority levels appropriately, and the end result would be the same in terms of overall fairness.

Other embodiments might allow the weights to be arbitrary integers, rather than the fixed values in the example above. This would allow the Administrator or End User to configure even greater unfairness between Flows in the goal function, should it be required.

Also note that as with all quality of service (QoS), these weight settings only matter when there is contention for the available WAN capacity. If there is no contention it means that the data within all of the queues completely fits within the available capacity, so the ratios between their usages are the natural ratios from the applications generating different volumes of data.

Other embodiments might have completely different goal functions that do not take fairness into account at all. For example:
Ensuring the largest number of flows are satisfied by the available WAN capacity;
Maximizing the total throughput achieved by the serviced flows; or
Minimizing changes to the current bandwidth allocation on BoD connections.

In some embodiments, the way a WAN connection is used can alter its properties, making it ineligible to service certain Flow Classes. For example, some types of connections can achieve high throughput, but at the expense of causing a higher RTT.

An embodiment with a goal function that seeks to maximize throughput would choose to service flows with a high throughput requirement, which would cause the WAN connection RTT to increase and make it ineligible to service Flow Classes with a low latency requirement.

Conversely, an embodiment with a goal function seeking to service the largest number of flows might choose the opposite trade-off, such that the low latency Flow Classes could continue to be serviced by this WAN connection.

In some embodiments, a distinct Scheduler connection sort order is maintained on a per-flow basis rather than globally for all flows.

This allows flow-specific requirements to influence the sort order so that the flow's packets are assigned to connections in a way that meets its needs.

For example, a VoIP flow that has a preferred maximum latency tolerance of 150 ms will want sort criteria that places connections with an RTT greater than 150 ms at the bottom of the list. Conversely, a TCP flow with no specific latency requirement will want to prioritize connection throughput in its sort criteria instead, either completely ignoring RTT, or only using it as one of many secondary criteria.

In some embodiments, these flow requirements and preferences are configured in the form of rules that consist of a Match Criteria and a consequent Behaviour.

For example, Match Criteria could take the form of an IP 3-tuple (Protocol, Source IP, and Destination IP) or IP 5-tuple (Protocol, Source IP, Source Port, Destination IP, and Destination Port). A Behaviour could take the form of an explicit preference for latency or throughput, with target preferred values for either.

Examples of other heuristic-based Match Criteria could include:
DSCP tags
Any of the other header fields available in the IP (v4 or v6) header
Any of the other header fields in TCP or UDP headers
Cumulative volume of data transmitted—e.g. a TCP flow that exceeds a volume threshold could be matched as a "bulk data transfer", whereas one that does not could be matched as an interactive SSH/telnet session
Cumulative duration of the flow
Regular expression match against packet payloads Cleartext parameters extracted from a TLS handshake (e.g., SNI, CN, SubjectAltName)

Examples of other Behaviours that could affect Scheduler sort order include:

Specific preferences for connection order (e.g. the user may prefer to sort an expensive connection to the bottom of the list for low priority flows)

Jitter tolerance

Maximum latency tolerance

Amount of desired redundancy (e.g., FEC)

Whether retransmissions of lost packets are desired, and if so, if there is a maximum time limit after which retransmissions attempts should stop Whether explicit packet pacing is desired For example, a real-time video app transmitting video at 30 frames per second might transmit its video frames exactly 33.3 ms apart, and would not want the multipath system 100B to change the pacing In contrast, a bursty application might benefit from having the Scheduler explicitly pace its bursts at the aggregate WAN rate.

Desired throughput (e.g. minimum, target, maximum)

Rules (both Match Criteria and Behaviour) could be generated automatically using machine learning techniques that analyze traffic patterns.

Inputs (Features) to the ML method could include:

i. Cumulative volume of data transmitted ii. Size distribution of packets (histogram)

iii. Inter-packet spacing (both pacing and jitter)

iv. Frequency and grouping of packets v. Packet header fields (Ethernet, IP, TCP, UDP, etc.)

vi. Contents (payload) of packets vii. Intended destination of packets, beyond just IP addressing (e.g. the SNI, CN, and SubjectAltName fields in a TLS handshake and exchanged certificates)

viii. Cumulative duration of the flow ix. Time of day x. Number of concurrent flows to the same destination or from the same source xi. Current or historical Predictions (Labels) for any concurrent flows to the same destination or from the same source (e.g. some applications open multiple flows, one as a control plane, another as a data plane—knowing that an existing control plane flow exists could help in predicting a data plane flow)

Predictions (Labels) from the ML method would include any of the aforementioned Behaviours, determined based on the Behaviours of the training corpus.

In some embodiments, Rules can have the concept of dependent Rules that apply further Match Criteria and more specific Behaviours, while still being governed by their parent Rule. For example:

A VPN flow identified by an IP 5-tuple could have a Rule defined with Match Criteria and Behaviours. This would be considered the "parent" rule.

The VPN will carry within it many inner flows from the applications being protected by the VPN. Normally these inner flows would be completely hidden from the Match Criteria (encrypted by the VPN).

However, some VPNs might choose to expose a limited set of information about the inner flows, through setting DSCP tags on the encrypted packets that correspond to the preferences of the inner (cleartext) packets.

A dependent Rule could be created that matches on DSCP tags, but the resulting available Behaviour would still be governed by the parent rule. For example:

a. Generally, VPNs require packets to be delivered in-order (they can tolerate mis-ordering, but only up to a small window).

b. Behaviours configured on a dependent Rule that match DSCP tags must not result in the parent Rule delivering packets significantly out of order.

For example, a dependent rule that requests a maximum latency limit of 150 ms, and a second dependent rule that requests maximum throughput could violate the ordering requirements of the parent Rule, since interleaved packets from these two dependent Rules could be assigned to connections with drastically different latencies.

Figure 5A:
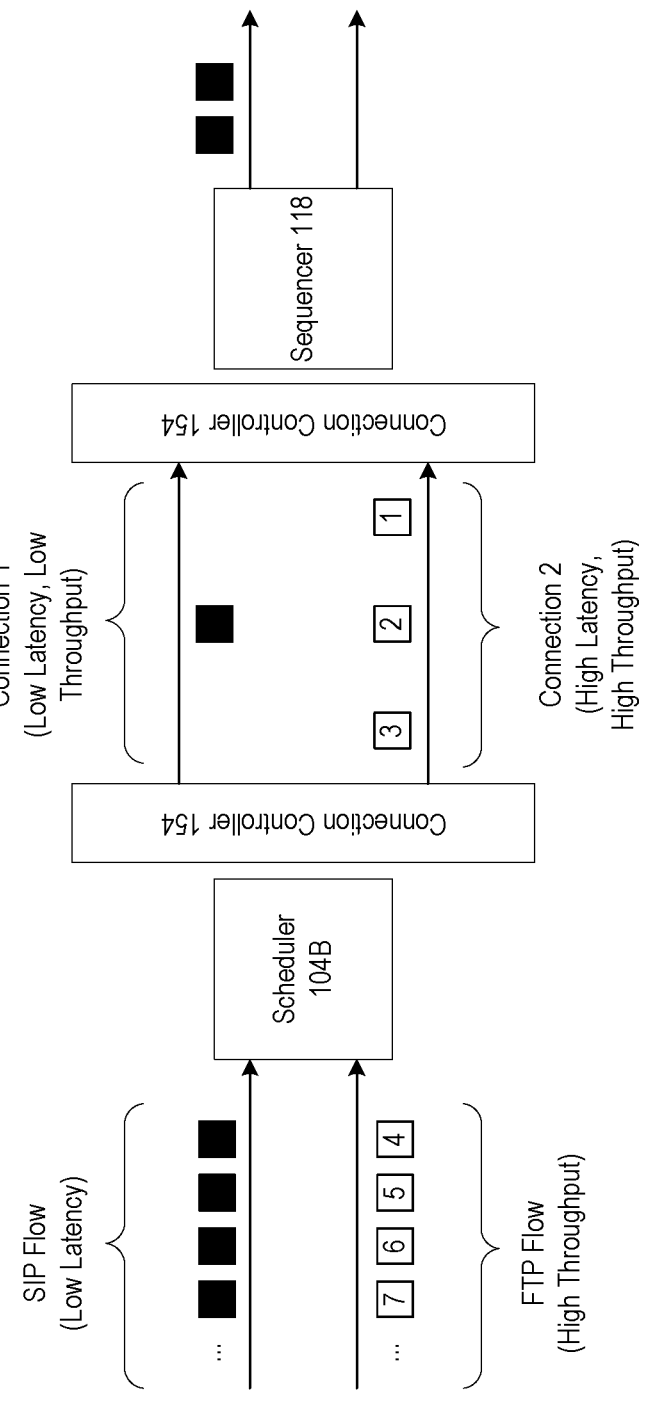
FIG. 5A is a schematic diagram of the push communication system of FIG. 1B scheduling two independent data flows for transmission, according to some example embodiments.

FIG. 5A illustrates two independent flows, where the Rules and Behaviours on each one are completely independent. In this example, the SIP Flow requires low latency, so the Behaviour causes Scheduler 104B to only transmit its packets on Connection 1. Conversely, the FTP Flow requires high throughput, so Scheduler 104B only transmits its packets on Connection 2.

As the packets for these two flows are transmitted over the air and arrive at Sequencer 118, they are put back in order and transmitted to the final destination independently. In this example, Sequencer 118 is transmitting packets belonging to the SIP Flow that have already arrived and are in the correct order, irrespective of the state of the FTP Flow, where its packets are still in transit over the air.

Figure 5B:
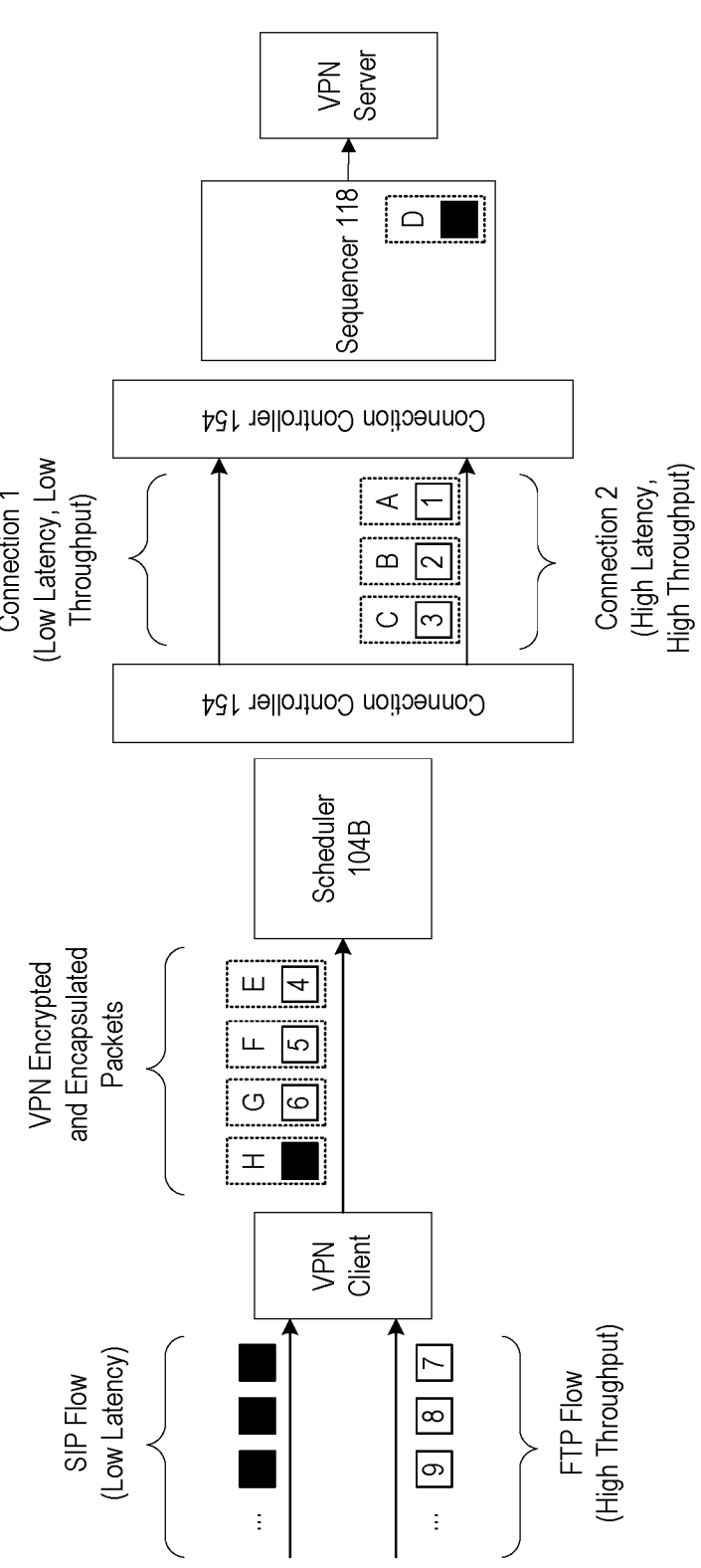
FIG. 5B is a schematic diagram of the push communication system of FIG. 1B scheduling two dependent data flows for transmission, according to some example embodiments.

FIG. 5B illustrates the concept of dependent flows. In this example, the same SIP Flow and FTP Flow are present, but they pass through a VPN client for encryption and encapsulation before Scheduler 104B sees them.

Coming out of the VPN client, the packets from both flows have the same IP 5-tuple, so Scheduler 104B and Sequencer 118 treat this as the parent flow, and are constrained by its requirements.

The existence of the dependent flows (SIP and FTP) are communicated using DSCP tags, and they control how Scheduler 104B assigns the packets to Connection 1 and 2 for transmission. In this example, the assignment is the same as in FIG. 5A.

However, the parent flow constraint requires the packets to be transmitted from Sequencer 118 in the same order that they arrived at Scheduler 104B. As such, in this example, even though the packet belonging to the dependent SIP flow has already arrived at Sequencer 118, it cannot be transmitted until the packets belonging to the dependent FTP flow arrive and are transmitted first.

FIG. 6A at 600A is a sample embodiment of a Rule Management page. The configured Rules are displayed in a table, with each row summarizing the Match Criteria and Behaviour. The order in which the Rules are listed is the order in which packets are matched against them. FIG. 6B at 600B shows the workflow for changing the order of the rules.

FIG. 6C at 600C shows how each row in the table can be expanded to show the details of the Match Criteria and Behaviour, as well as the currently active flows passing through the system that match this Rule.

Each rule in the table includes an Edit and Delete icon.

Figure 6D:
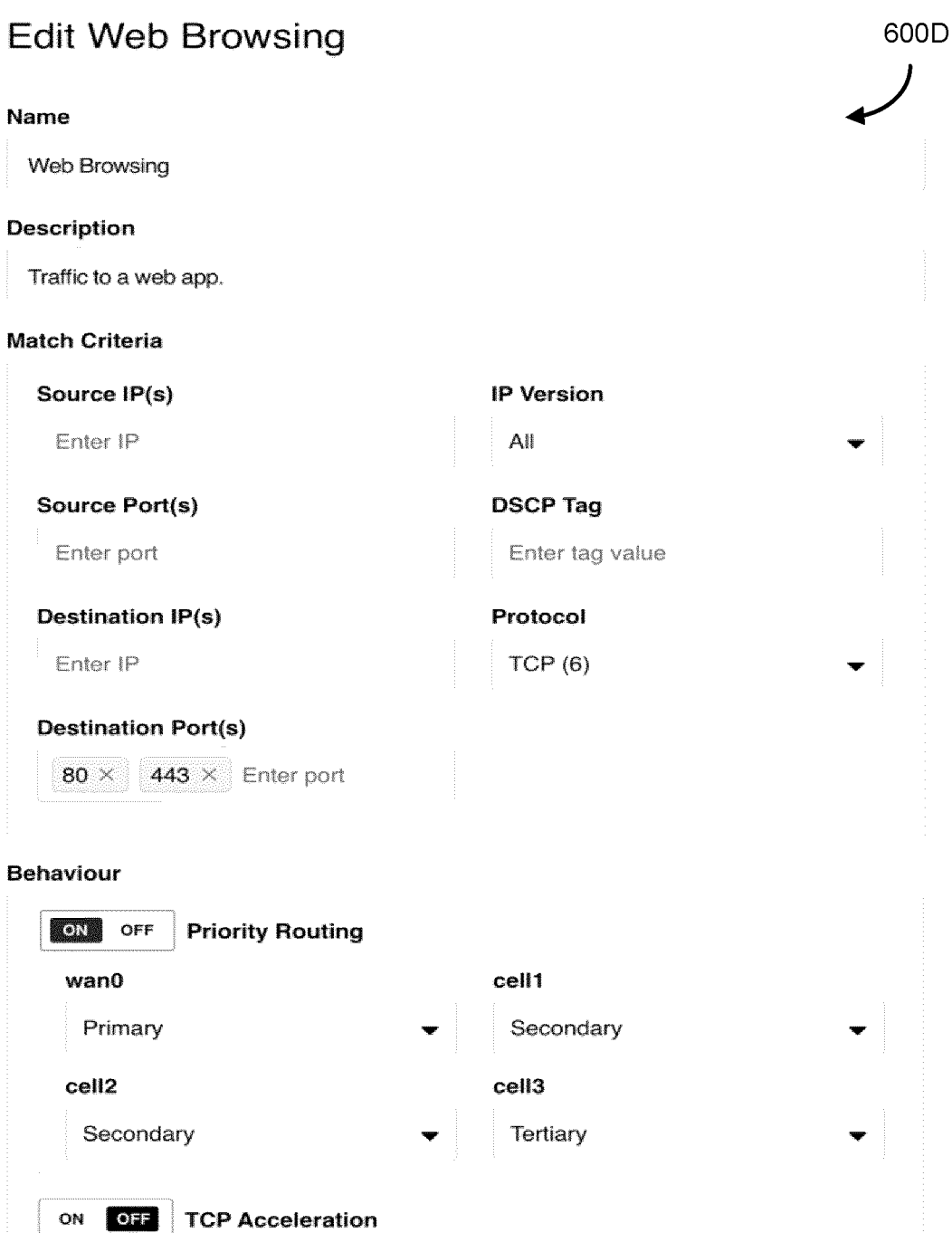

FIG. 6D at 600D shows the dialog that appears when the Edit button is clicked. The Match Criteria and Behaviour for the rule can be changed in this dialog.

Figure 6E:
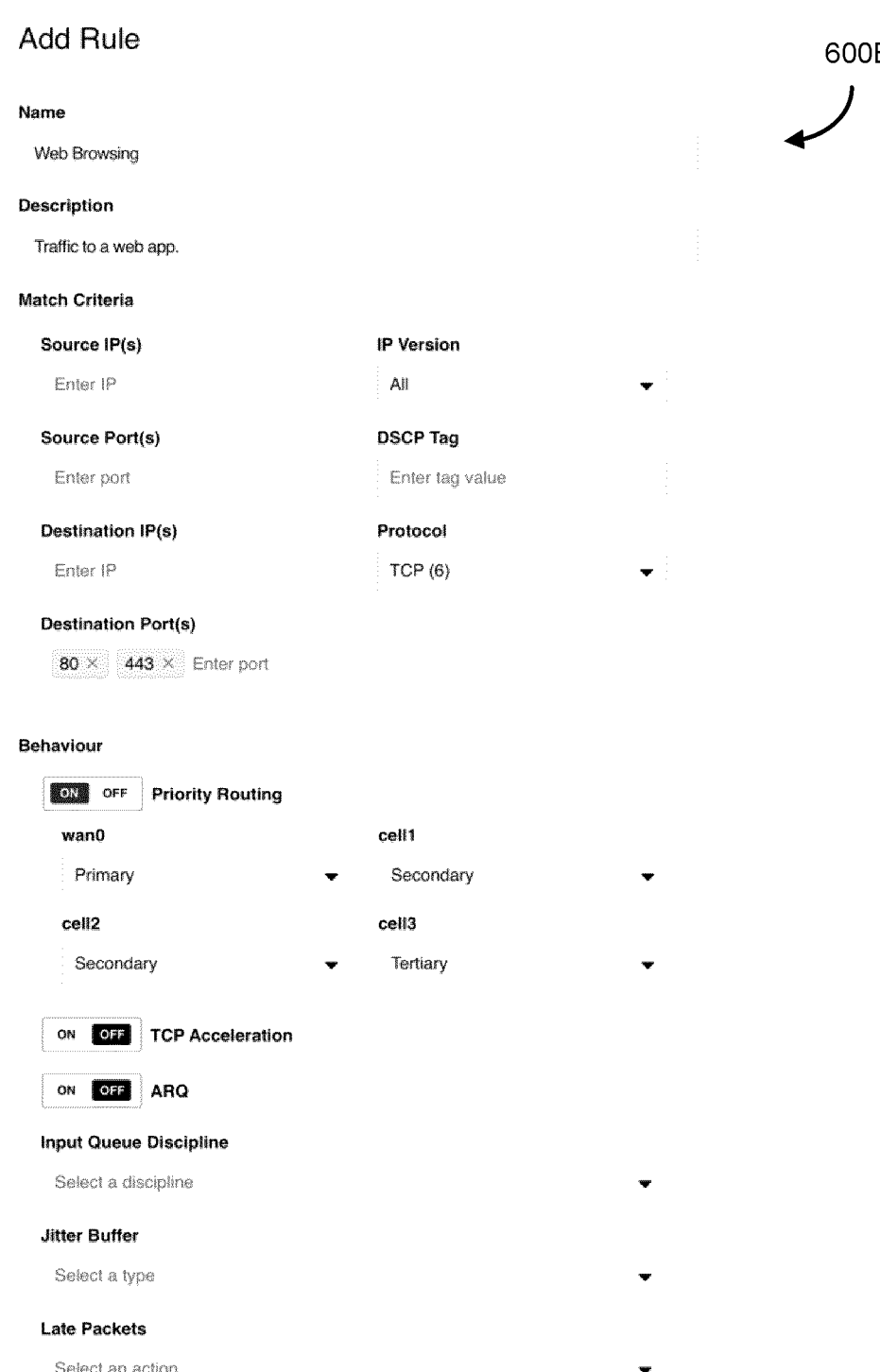

On the main Manage Rules screen, there is a separate "Add Rule" link, and FIG. 6E at 600E shows the modal dialog that appears when it is clicked.

In some embodiments, the Rules will be configured on the transmitter side, and will be automatically pushed to the receiver. By default, rules will be symmetric and bi-directional. Meaning, when a Rule is added and its Behaviours configured, a matching paired Rule will be transparently added, but the source and destination Match Criteria will be swapped. It will be possible to add asymmetric rules (different Behaviour for either direction of the same flow) through an advanced configuration screen.

In one embodiment, the Scheduler probes various network characteristics of a plurality of connections (to determine the measured characteristics for each connection) and uses the measured characteristics in combination with the transmission requirements to make decisions about packet transmission.

For example, one such decision is determining how many packets to transmit on a particular connection and when to transmit these packets.

Some embodiments are volume-based. Such embodiments operate by determining a limit on the volume of data (for example, in units of bytes or packets) that can be transmitted on a particular connection. Once enough packets have been transmitted in the amount of that volume, transmission stops until some feedback is received about these packets. If feedback is received before the full volume limit has been transmitted, the transmission can continue without stopping, as long as the volume of data sent for which no feedback has been received does not exceed the determined volume limit.

In one embodiment, the volume of data is chosen to be the congestion window (CWND) of the connection. Briefly, the CWND is the maximum volume of data that can be sent on a connection, before receiving any feedback, without causing significant congestion on that connection. A multitude of methods exist to estimate the CWND. It is assumed that the Scheduler has access to one such method and is able to receive a CWND estimate through it.

In some embodiments, the Scheduler is required to determine the rate at which data is being transmitted (for example, in units of bytes per second). The rate can be then used to make other decisions about packet transmission.

For example, in one embodiment, if the rate of data being transmitted on the currently active network connection(s) is less than the rate of data being received from the source application for transmission, the Scheduler can decide to activate more connections to increase the aggregate transmission rate to accommodate the application rate.

In another example, an embodiment might have to satisfy a Quality of Service (QoS) requirement, which can be expressed in terms of a guaranteed rate of transmission. If the aggregate rate drops below the required level, the Scheduler can decide to activate more connections to increase the aggregate transmission rate to satisfy the QoS requirement.

In yet another example, an embodiment might be required to measure the goodput (i.e. the rate of application data getting across the network successfully) for purposes of guaranteeing an application performance level, optimizing performance, reporting, etc.

In one embodiment, TCP performance can be optimized by pacing the transmitted packets at the aggregate rate achieved by a plurality of connections. See, for example PCT Application No. PCT/CA2020/051090.

In embodiments where rates are required for some functions, a volume-based Scheduler requires a method to transform the transmitted volume of data into a rate.

Trivial approaches that convert the volume to a rate by dividing it by the duration of time over which it was transmitted generally yield inaccurate results. Such approaches measure that transmission rate at the sender, rather than the actual rate data is moving across the network. The actual rate at which data is moving across the network is truly determined by the rate at slowest link of a multi-link network, commonly referred to as the bottleneck of the network.

The characteristics of the bottleneck link of a network are not available to the sender or receiver, especially knowing that multi-link networks can change the combination of used links at any time and in a transparent fashion to the sender and receiver. However, congestion control methods are capable of generating estimates based on the observed performance at the sender and receiver.

In some embodiments, the congestion control method can provide an estimate of the transmission rate of the bottleneck link. This is sometimes referred to as the bottleneck bandwidth BtlBw of the network.

In some embodiments, the round-trip propagation time RtProp of a network can be estimated by sampling the time between when a packet is sent and when feedback about the packet is received.

The combination of BtlBw and RtProp can be used to determine a network property referred to as the Bandwidth Delay Product, BDP, as follows:

$$BDP=BtlBw \times RtProp$$

The most common unit for BDP is bytes. Moving forward the following units are assumed for these quantities: (i) bytes per second for the BtlBw, (ii) seconds for the RtProp, and accordingly (iii) bytes for the BDP.

Figure 7:
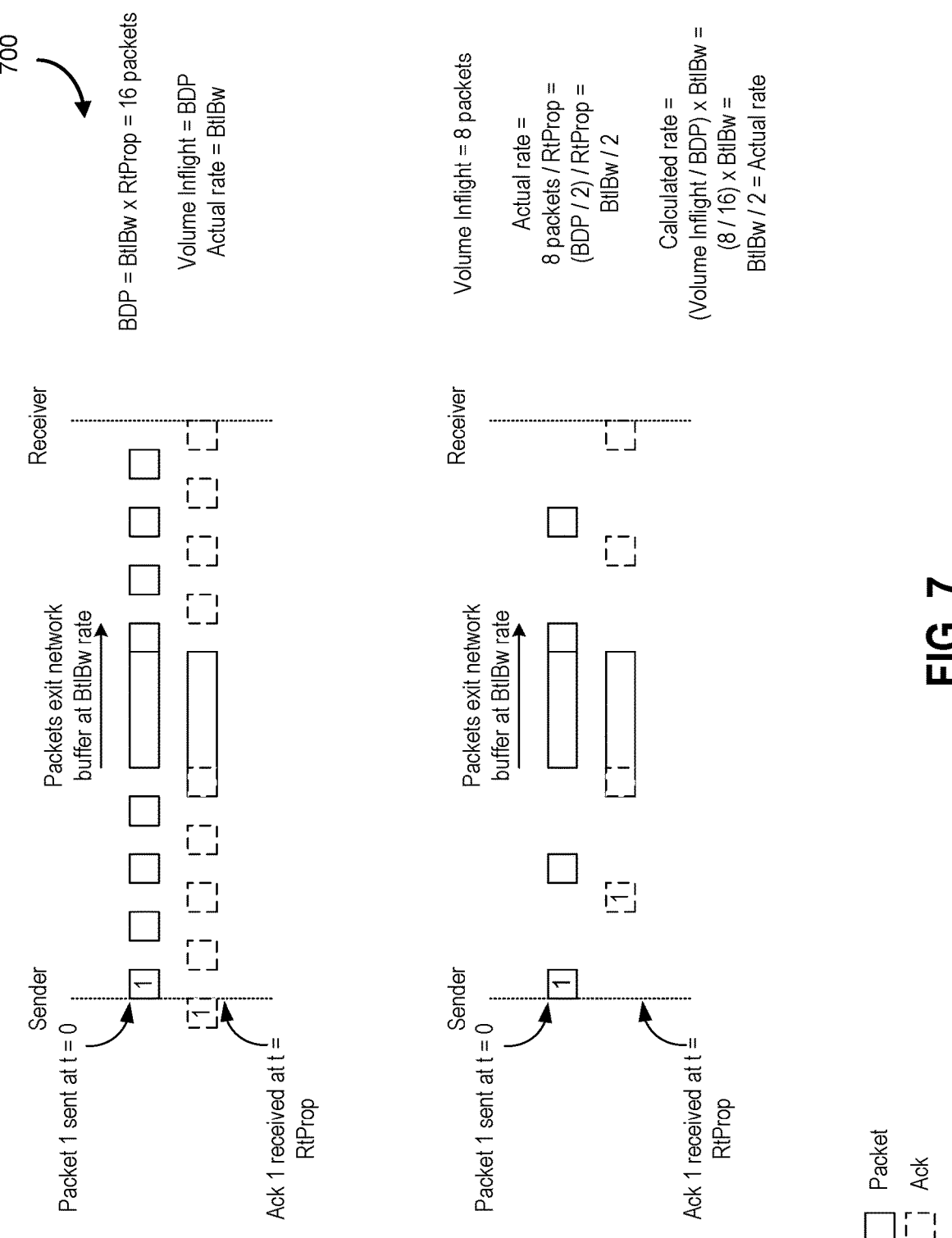
FIG. 7 is a diagram of data packet transmissions, according to some example embodiments.

The BDP signifies the amount of data that will be in the network (inflight) when it is operating under ideal conditions, assuming data is always available for sending. The network would be transferring data at its nominal rate, BtlBw, and providing feedback about every packet exactly after RtProp time from sending that packet. FIG. 7 shows two examples at 700. The top half of FIG. 7 illustrates this concept using an example where the BDP consists of 16 equally sized packets. In practice, the amount and size of packets can differ as long as the total size is equal to the value calculated using the BDP.

In some volume-based embodiments, the BDP can be used to estimate various data transfer rates, some examples of which were described previously.

For an inflight volume of data under consideration, if the volume is smaller than the BDP, assuming ideal conditions, then only a fraction of the network's nominal rate, BtlBw, can be achieved. This fraction can be calculated as the ratio of the volume to the BDP. The resulting achieved rate is determined as:

$$\text{Achieved rate corresponding to inflight volume}=\text{volume}/BDP \times BtlBw$$

In practice, networks seldom operate under ideal circumstances. For example, packets may be buffered temporarily before being delivered to the receiving end, or the feedback might be delayed at the receiver or by the network. In some cases, packets might be lost and never make it to the receiving end, thereby not triggering any feedback. In other cases, the feedback itself might be lost. The loss can, for example, be deduced when feedback of newer packets is received, or based on timers expiring.

Waiting for delayed feedback (that may or may not arrive) to trigger the next transmission event can artificially limit the achievable rate on a network.

Figure 8A:
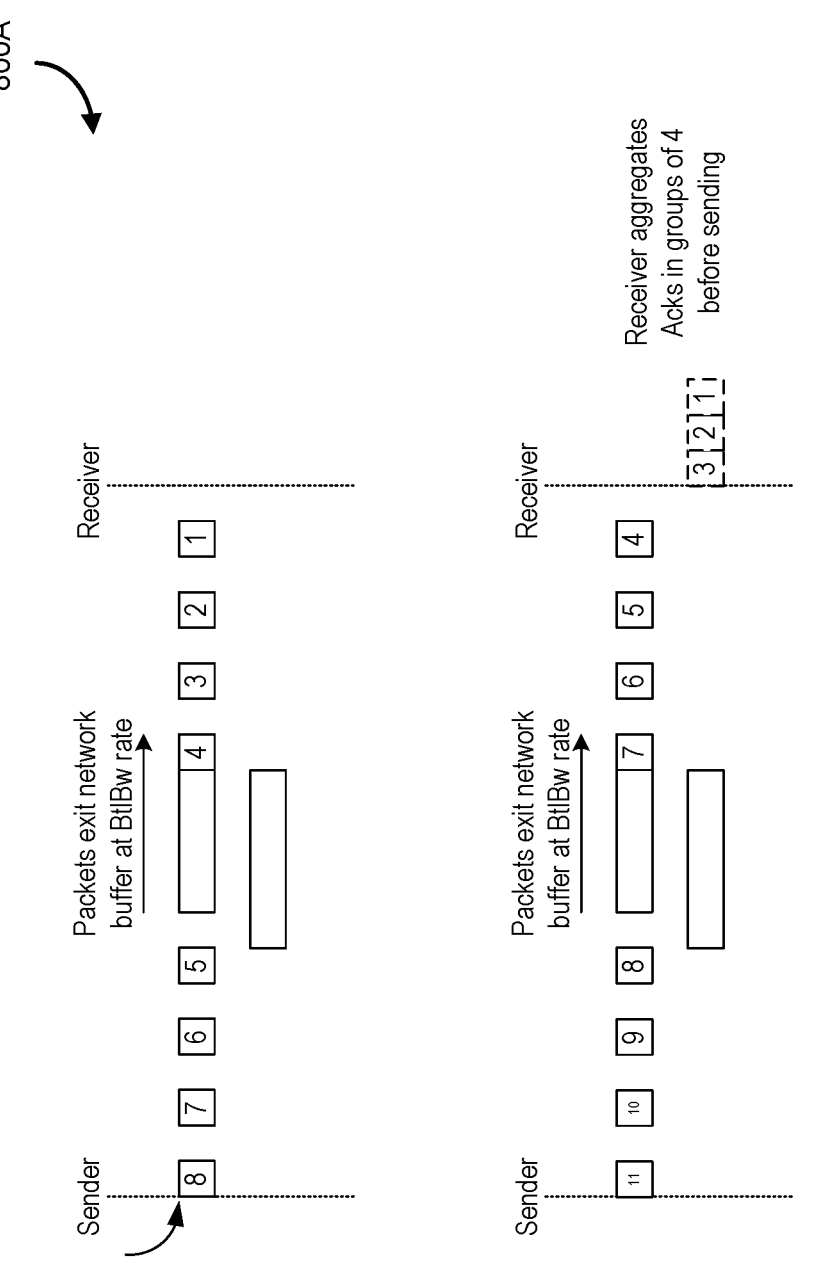
FIG. 8A is two diagrams of unidirectional data packet transmissions, according to some example embodiments.

FIG. 8A at drawing 800A, shows an example of a receiver that aggregates feedback and sends acknowledgements back to the sender once for every 4 packets received.

US 12,598,115 B2

35

Figure 8B:
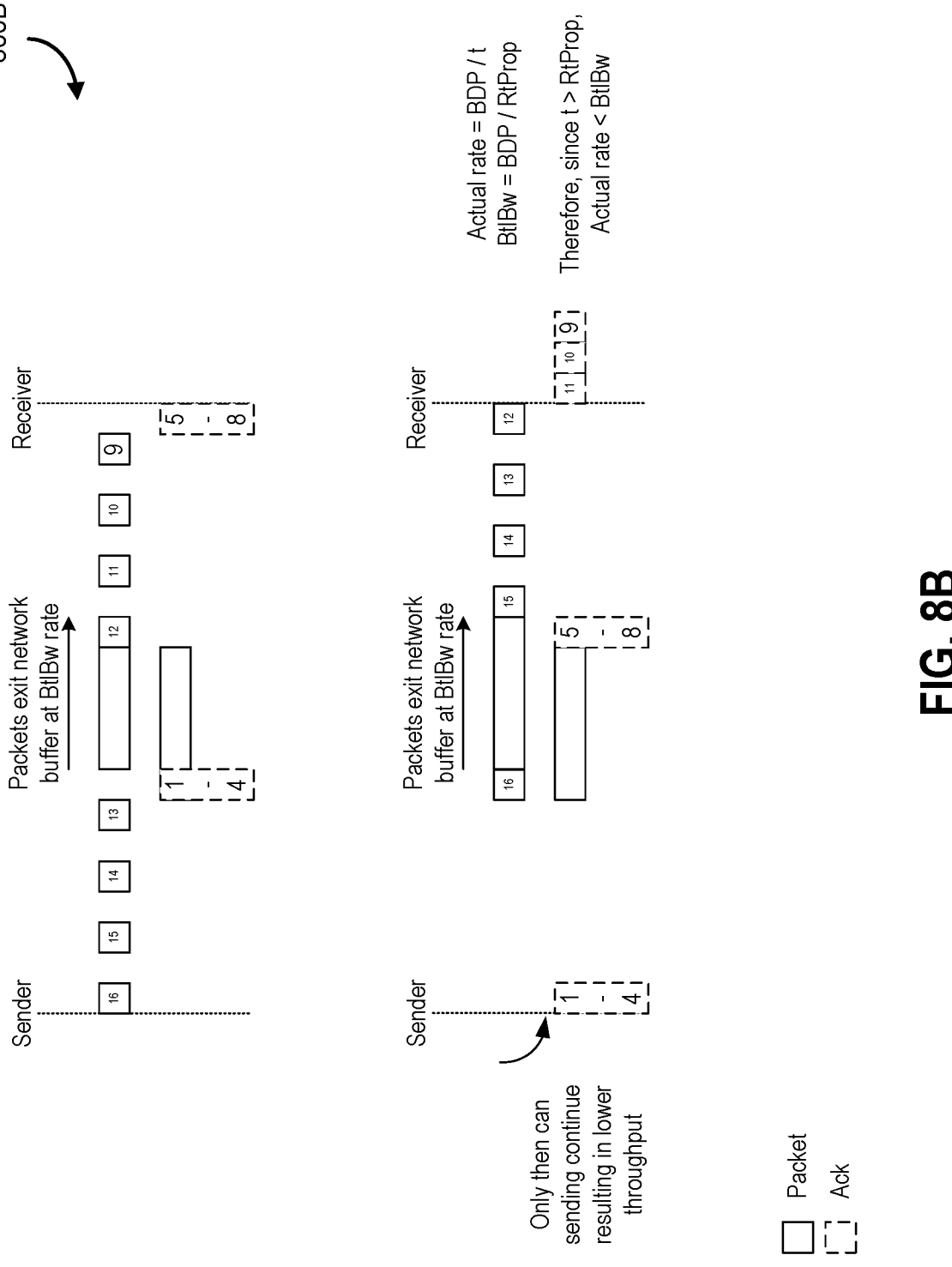
FIG. 8B is two diagrams of data packet transmissions occurring in response to acknowledgements, according to some example embodiments.

FIG. 8B, at drawing 800B, continues to demonstrate how, for example, the aggregation of acknowledgements results in the overall throughput being less than the capability of the network. The sender waits for a longer time to start sending the next group of packets. Overall, the sender ends up sending the same amount of packets as the ideal case in FIG. 7 but over a longer period of time, resulting in lower throughput.

In one embodiment, this artificial limitation is overcome by specifying an additional allowance of data to send even when feedback for previously transmitted packets has not been received yet. This implies that the volume of data inflight might exceed the BDP. In such cases however, the network is not actually transferring data at a higher rate, as application of the achieved rate equation above might suggest. The additional allowance simply allows the sender to maintain a constant rate that is equal to the BtlBw over a longer period of time. Accordingly, the estimated transfer rate for the volume at hand is capped at BtlBw.

Figure 8C:
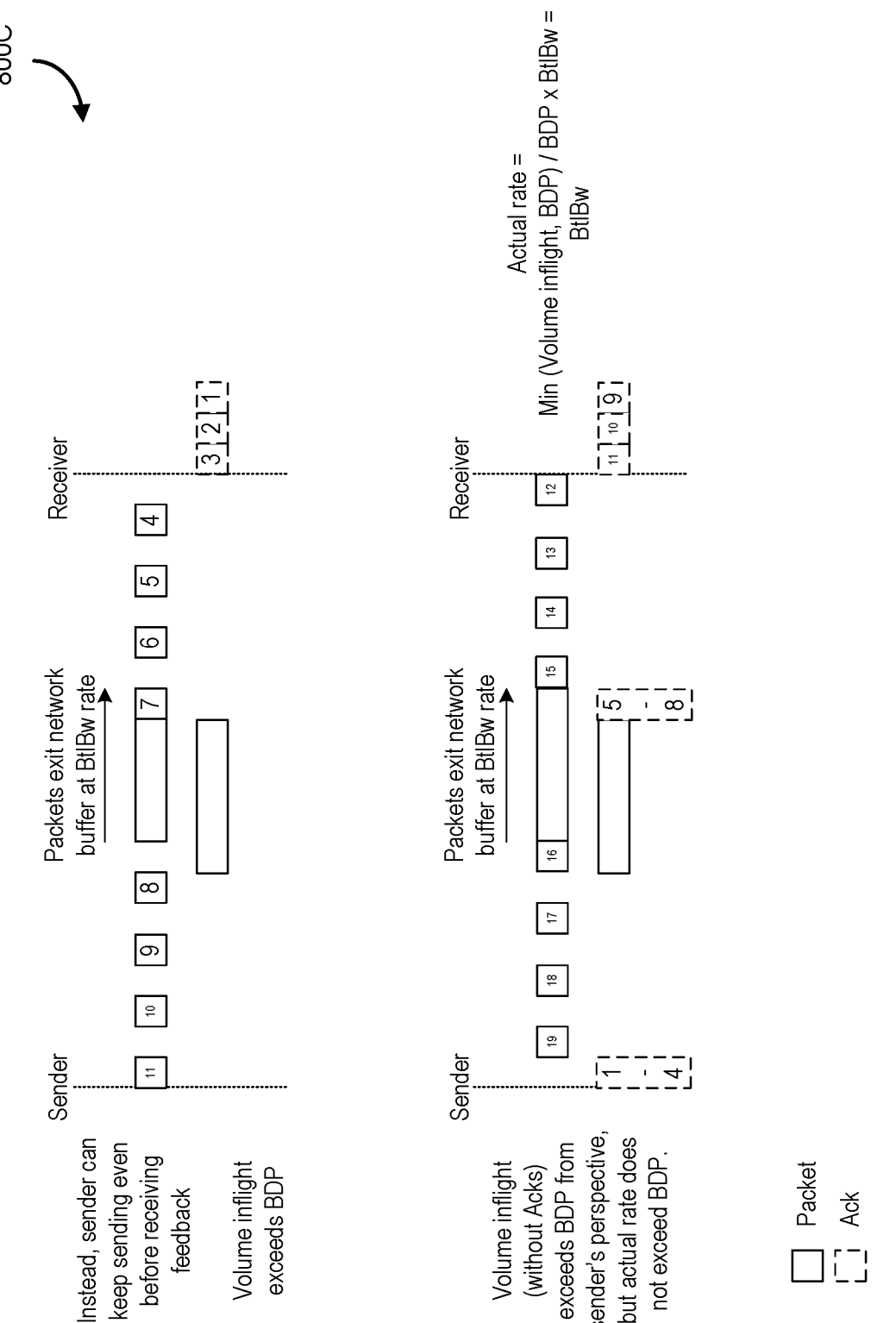
FIG. 8C is two further diagrams of data packet transmissions occurring without requiring acknowledgements to send further data packets, according to some example embodiments.

FIG. 8C, at drawing 800C, continues to demonstrate how, for example, the sender uses such an additional sending allowance to continue sending packets before acknowledgements are received. The volume of data inflight, 19 packets, exceeds the BDP, 16 packets. However, the actual rate matches the capability of the network, and the capping of the calculated rate, by using the minimum of the volume inflight and the BDP, achieves the same result.

In some embodiments, a similar approach can be used to estimate the goodput that could possibly be achieved on the network, referred to as the potential goodput from here on.

A particular volume of data can be split into a goodput portion and the other portion. The goodput portion contains newly transmitted application data. The other portion contains data that cannot be counted as newly transmitted application data, for example, retransmissions of previously lost data, control data, probing data, etc.

If the full volume of data is larger than the BDP, packet and/or feedback delay are assumed as above. No extra space is assumed to be available for additional goodput. The resulting (potential) goodput rate is estimated as follows:

$$\text{Goodput rate}=\text{Goodput portion/Full volume}\times BtlBw$$

Figure 9A:
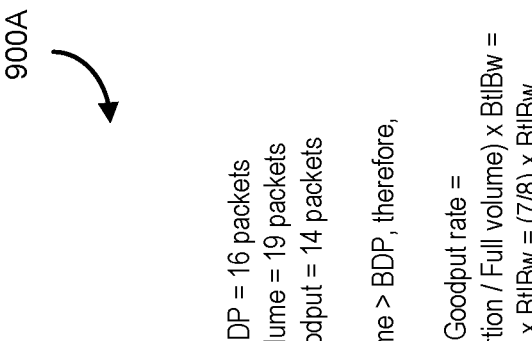
FIG. 9A is a diagram of in-flight goodput data, according to some example embodiments.
Figure 9A:
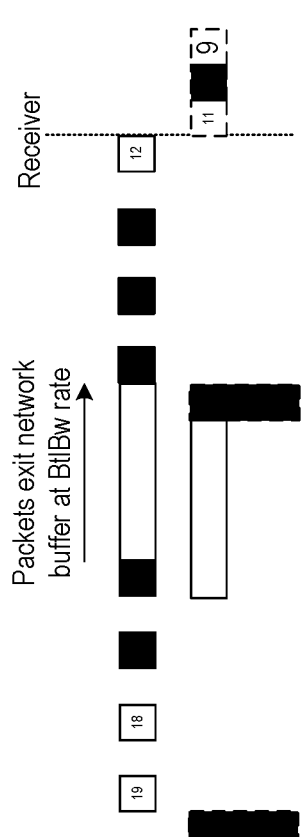
Figure 9A:
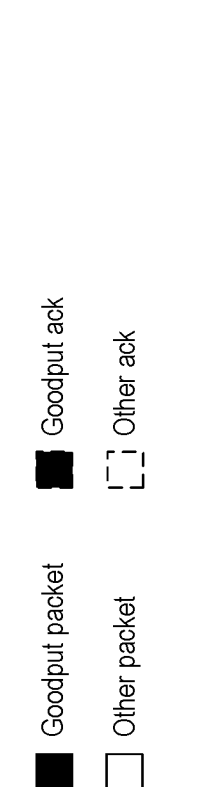

For example, FIG. 9A at 900A shows a network with a BDP of 16 packets. The volume put inflight is 19 packets in order to achieve a throughput that is equal to the capability of the network. However, only 14 packets are goodput, resulting in a goodput rate of ⅞ of the capability of the network. If the volume of data is smaller than the BDP, the difference is considered to be the extra space assumed available for additional goodput.

Figure 9B:
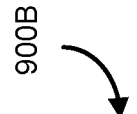
FIG. 9B is another diagram of in-flight goodput data, according to some example embodiments.
Figure 9B:
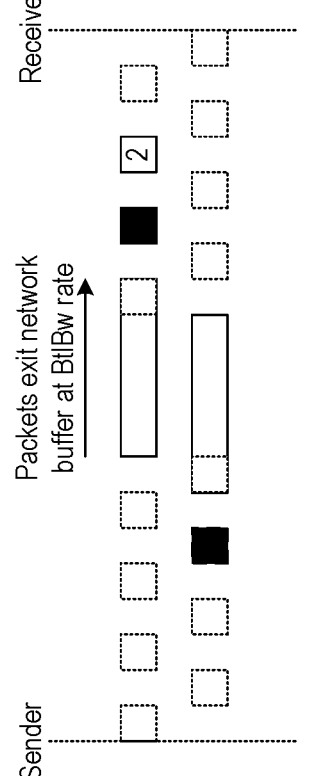

FIG. 9B at 900B shows an example where only 3 packets are inflight, resulting in an extra space of 13 packets that can be assumed to be goodput when calculating the potential goodput rate. This extra space has to be limited by the CWND that the congestion control method determines. At any point, the additional volume that congestion control allows is the difference between the CWND and the full volume. If the goodput extra space exceeds this congestion control allowance, it is simply limited to it.

FIG. 9C at 900C shows an example where the CWND has been reduced to 11 packets, which limits the extra space assumed available for additional goodput to 8 packets.

The resulting potential goodput rate is estimated as follows:

$$\text{Potential goodput rate}=(\text{Goodput portion}+\text{Limited goodput extra space})/\text{BDP}\times BtlBw$$

36

Continuing the above examples, FIG. 9B and FIG. 9C show how above potential goodput equation results in a lower potential goodput rate for the scenario in FIG. 9C, which is as expected given the CWND reduction enforced by the congestion control method.

While the above approach is described for goodput and potential goodput rates, it can be easily modified to calculate the rate or potential rate of any type of data that partially makes up the full volume.

The following is a numerical example applying the previously described equations on a network with properties typical to those experienced over LTE cellular networks.

$BtlBw$=10 Mbps $RtProp$=60 ms

BDP=10 Mbps*60 ms=75 KB

CWND=60 KB

Goodput portion=25 KB

Other portion=10 KB

Full volume=25 KB+10 KB=35 KB

Goodput extra space=BDP−Full volume=75 KB−35 KB=40 KB

Congestion control allowance=CWND−Full volume=60 KB−35 KB=25 KB

Limited goodput extra space=Min(Goodput extra space,Congestion control allowance)=Min(40 KB, 25 KB)=25 KB Potential goodput rate=(Goodput portion+Limited goodput extra space)/BDP×$BtlBw$=(25 KB+25 KB)/75 KB×10 Mbps=50/75×10 Mbps=6.67 Mbps Systems that communicate over IP networks often implement a congestion control mechanism that attempts to achieve fair network utilization by all network nodes employing similar congestion control mechanisms.

Congestion control mechanisms often operate by monitoring the communication happening over the network, possibly probing the network when needed, and deriving network properties based on the results. A model representing the network is created and future communication is guided based on this model. For example, the model can track network properties such as the current and maximum throughput achieved, the current and minimum round-trip time of packets, packet loss events, etc.

Based on the created model and the tracked information, the congestion control mechanism can determine when the network is underperforming, indicating that the network is possibly experiencing congestion. The congestion control mechanism may then take corrective action that aims to reduce or remove the network congestion and restore desirable network performance.

In traditional congestion control embodiments (e.g., TCP), packet loss is used as an indication of network congestion, and corrective action (e.g., reducing CWND) occurs in response to loss.

In one embodiment, the latency of packets, i.e. the time required for packets to traverse the network from the sender to the receiver, is an indication of network performance. Packets with high latency can possibly be of no use to the receiver and get discarded, making their transmission wasteful. For example, a real-time VoIP application requiring low conversational delay between the participants will have no use for packets carrying voice data that is older than the maximum acceptable conversational delay.

In such an embodiment, a congestion control mechanism may monitor the latency of packets and attempt to control it, such that it does not exceed the acceptable level.

In one embodiment, the lowest latency measured for packets can form a baseline value, and future measurements can be compared to it. If the future measurements exceed a threshold value that is a function of the baseline value, the congestion control mechanism considers the network to be experiencing congestion.

In another embodiment, a similar approach uses the round-trip time of packets that is the time elapsed between sending a packet and receiving acknowledgement about it, instead of the latency.

In one embodiment, when the congestion control mechanism determines that the network is experiencing congestion based on increased packet delay, the congestion window (CWND) is reduced to limit the volume of data that can be sent on the network without receiving any feedback. The intent is to reduce the volume of data that will be or currently is being buffered by the network, which is a common cause of increased packet delay.

In one embodiment, the congestion window is reduced to the Bandwidth Delay Product (BDP) of the network. Theoretically, the BDP represents that volume of data that the network should be able to deliver without forming a standing queue of packets in its buffer, assuming that the packets are transmitted by the sender at a constant pace that reflects the throughput (BtlBw) of the network. Accordingly, this is expected to allow the network to recover, at least partially, and reduce the packet delay back to an acceptable level.

Figure 10A:
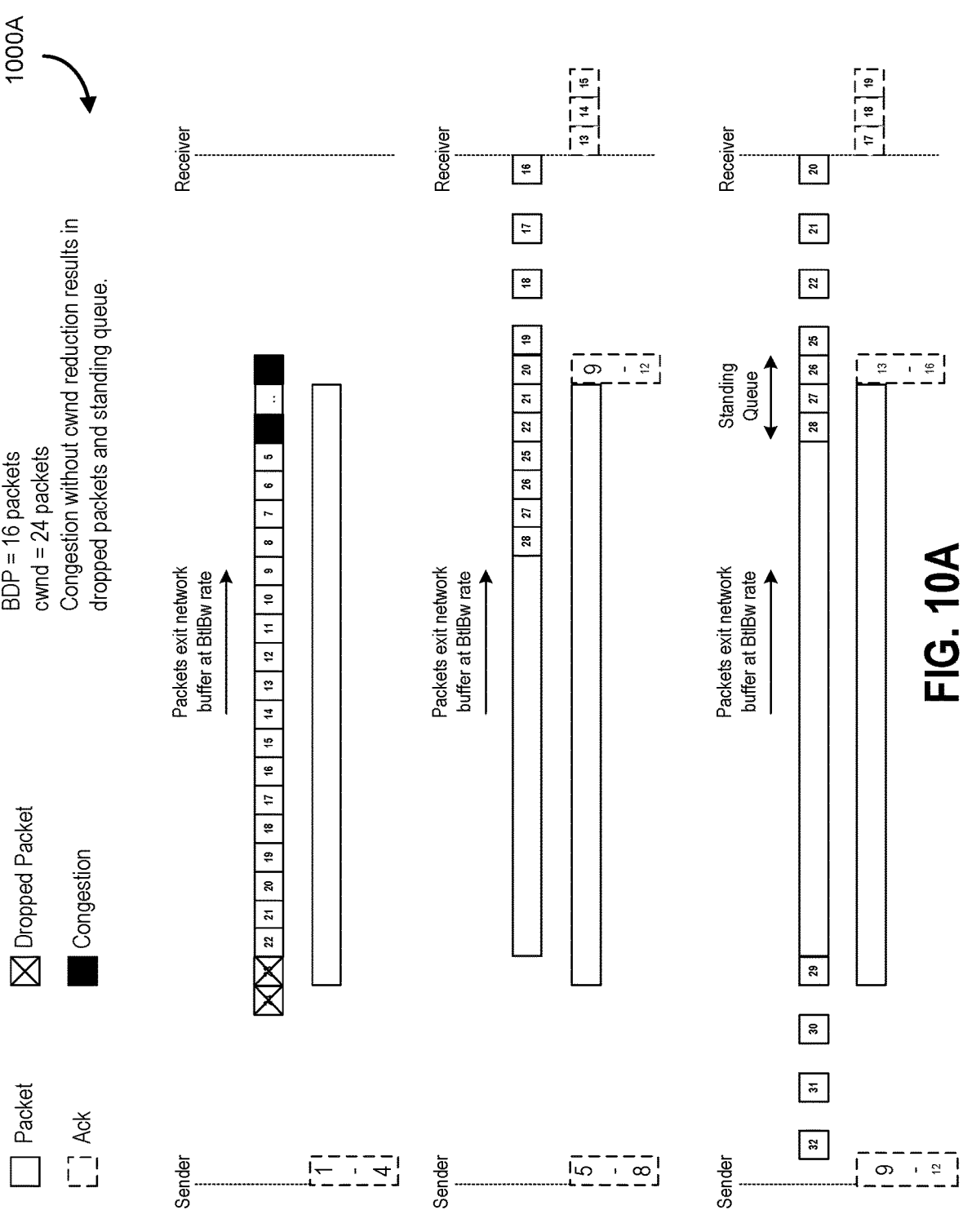
FIG. 10A is a series of diagrams showing data packet transmission where a connection is experiencing congestion, according to some example embodiments.

For example, assume a network with a BDP of 16 packets and a congestion control mechanism that determined a CWND of 24 packets to account for acknowledgement aggregation. FIG. 10A illustrates at 1000A how congestion from other network nodes can cause the sender to overwhelm the network. The sender in this case does not reduce its congestion window and puts the full amount inflight. This fills the network buffer and extra packets that cannot be buffered get dropped. Even after the congestion is cleared and normal draining of the network buffer continues, FIG. 10A illustrates how a standing queue would have formed inside the network buffer, which increases the round-trip time of all future packets and makes it easier to fill the network buffer.

Figure 10B:
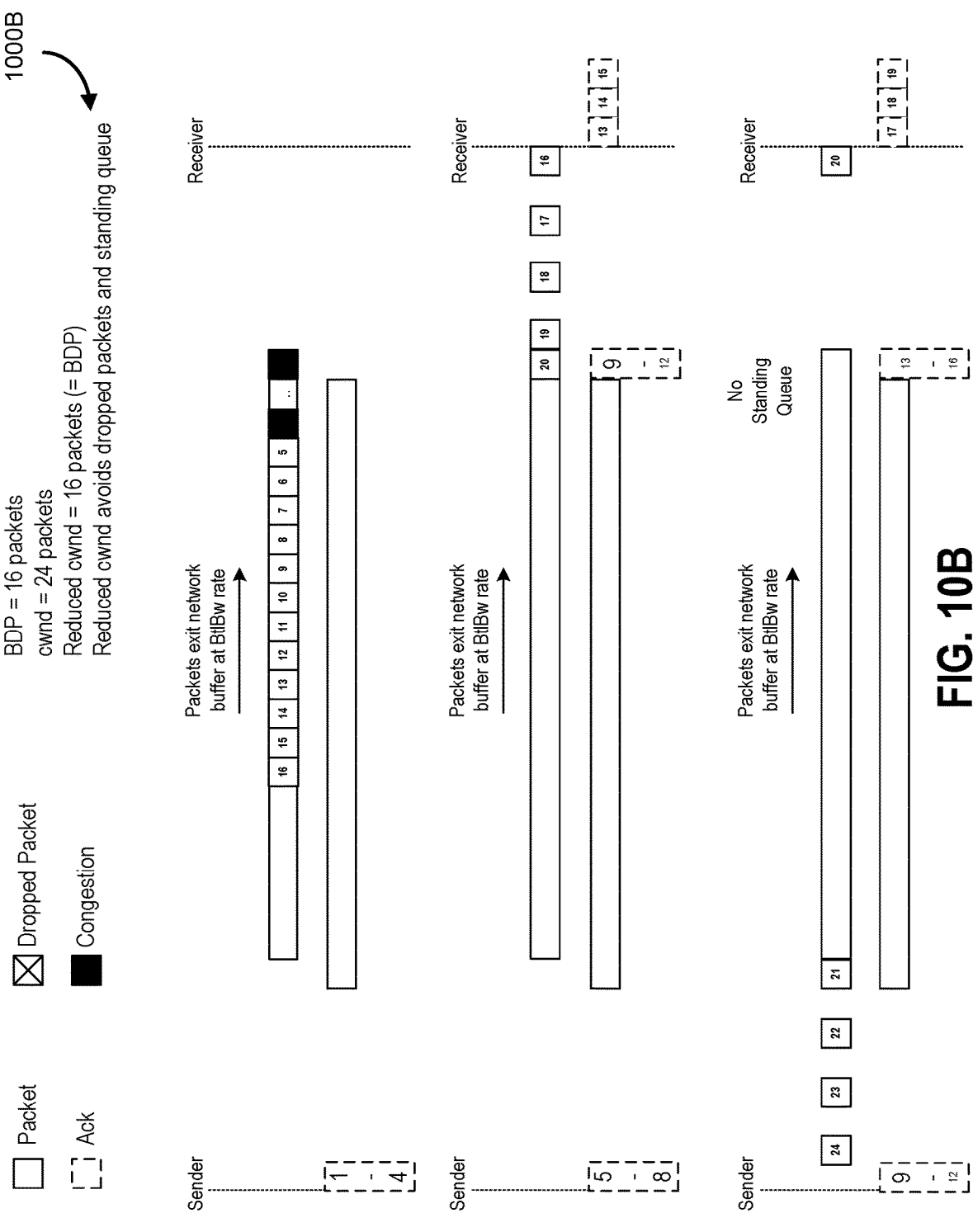
FIG. 10B is a series of diagrams showing data packet transmission after adjustment of transmission capacity in response to a connection experiencing congestion, according to some example embodiments.

Continuing the example, FIG. 10B at 1000B illustrates how a sender that reduces its congestion window to the BDP avoids both packet drops and formation of a standing queue. The sender can, for example, determine that congestion is occurring by detecting that feedback has not been received for a period of time that exceeds the baseline duration for feedback that it has measured in past transmissions. In another example, the sender can determine that congestion is occurring by receiving feedback that indicates that an amount of previously sent packets that exceeds the baseline loss experienced in past transmissions has not been delivered to the receiver. Responsive to this determination of congestion, the reduction of the congestion window to match the BDP reduces the amount of packets that will be put inflight. This consequently reduces the chance of filling the network buffer which previously led to packet drops. Moreover, putting only BDP packets inflight allows the network to drain its buffer completely (assuming the network properties have not changed) before new packets from the sender reach its buffer again.

In another embodiment, the congestion window is reduced to equal the volume of packets currently inflight.

The network is considered as no longer experiencing congestion when the congestion control mechanism determines that an acceptable level of performance has been restored.

In one embodiment, the reduction of the packet delay below a threshold value is an indication that network performance has been restored.

In one embodiment, that threshold value is determined as a function of the baseline delay value.

In another embodiment, transmitting a particular volume of data without incurring any loss is an indication that network performance has been restored.

In one embodiment, that volume of data is equal to the BDP.

In another embodiment, that volume of data is equal to the original value of the congestion window before it was reduced by the congestion control mechanism in reaction to congestion.

A push based architecture improves system performance on non-BoD connections for the most common application types. Table 3 summarizes the improvements that have been experimentally observed.

TABLE 3

| Application performance improvements due to Push based Scheduler | |
| --- | --- |
| Application/ Flow | Experimentally Observed Performance Improvements |
| Single ping flow | No more random RTT spikes due to packets being unnecessarily scheduled onto more than one connection, some of which may experience a latency spike when transitioning from idle to active (common for LTE connections) Ping packets stay sticky to the same WAN connection due to stable sort order |
| Non-accelerated TCP | Poorly performing WAN connections are sorted to the end of the list When the TCP sender ramps up bitrate such that its packets must overflow onto the poorly performing connections, it will see loss/latency, then pull back Average throughput oscillates around the aggregate throughput of the good connections |
| TCP inside VPN | Similar performance to non-accelerated TCP Also observed a reduction in the number of out-of-order packets since bad WAN connections are sorted to end and seldom used. As a result, a large VPN replay window is no longer required. |
| Video chat (e.g., Zoom ™, etc.) | App uses a smaller jitter buffer (resulting in lower two-way chat latency), since in the common case its traffic will stay sticky to the good WAN connections |

The push based scheduling methods also makes Priority Routing behaviour more intuitive. For example, in one embodiment, the decision of whether or not to engage lower priority connections depends only on how their BtlBw compares to the configured thresholds.

For example, consider the following scenario:

wan0
    Priority: Primary
    Target Threshold: N/A
    BtlBw: 10 Mbps
  wan1
    Priority: Secondary
    Target Threshold: 15 Mbps
    BtlBw: 30 Mbps With the pull based Scheduler, each time the 50 Hz timer of want wakes up and requests packets, the Scheduler provides it with packets for transmission since it finds that the desired target threshold (15 Mbps) is larger than what can be supplied by wan0 alone (10 Mbps).

However, it does this irrespective of the rate that packets arrive at the input. For example, if the input rate does not exceed 10 Mbps, it would be more optimal if want was not engaged since the traffic can fit entirely on wan0 alone.

With the push based Scheduler, wan0 will be sorted to the top of the list, and even if the thresholds indicate that want should be active, packets will be scheduled onto it only after the wan0 CWND is completely consumed. As a result, there will be less unexpected use of lower priority connections, improving performance.

In summary, the Scheduler of a multipath system can be implemented as either pull based (100A) or push based (100B). Push based is superior because the Scheduler is able to make packet scheduling decisions at a self-determined cadence, rather than be driven by the rate at which the target connections are ready to transmit. This self-determined cadence allows it to account for all factors that are important to the application that generated the packet, and/or the user of the system.

For example, a packet generated by a TCP-based application that requires maximum throughput would prefer that its packets be scheduled onto connections ordered from best to worst Mathis factor.

Also consider a more complicated example with the same TCP-based application, but where the user has configured the multipath system 100B with priority routing rules, preferring Connection 110B over all other connections 110N, unless the goodput achievable on 110B drops below 5 Mbps. In a hypothetical scenario where 110B has high throughput, low latency, but high packet loss, 110B would have a worse Mathis factor than all other connections 110N, The push based scheduler 100B would be able to make a complex scheduling decision to respect the user preference for using Connection 110B first, but also calculate the goodput achievable on 110B by converting its inflight CWND to a bitrate and using that to estimate its available goodput. If this availability drops below the configured 5 Mbps threshold, it can schedule packets onto the remaining connections 110N, ordered from best to worst Mathis factor.

Figure 11:
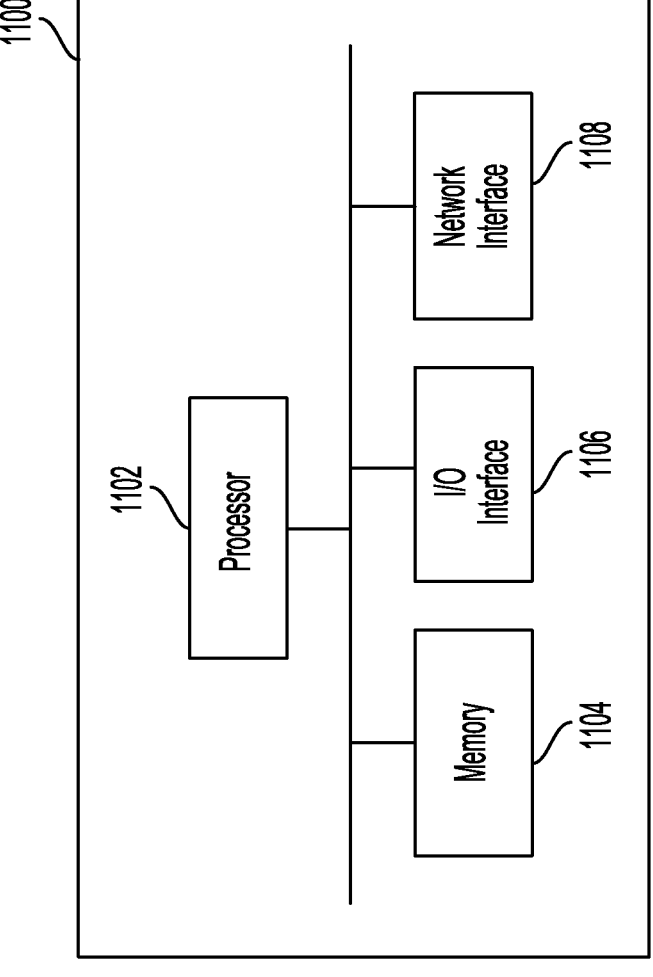
FIG. 11 is an example schematic diagram of computing device, according to example embodiments.

FIG. 11 is a schematic diagram of computing device 1100 which may be used to implement system 100B, in accordance with an embodiment.

As depicted, computing device 1100 includes at least one processor 1102, memory 1104, at least one I/O interface 1106, and at least one network interface 110B.

Each processor 1102 may be, for example, be a microprocessor or microcontroller (e.g., a special-purpose microprocessor or microcontroller), a digital signal processing (DSP) processor, an integrated circuit, a field programmable gate array (FPGA), a reconfigurable processor, a programmable read-only memory (PROM), or various combinations thereof.

Memory 1104 may include a suitable combination of various types of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1106 enables computing device 1100 to interconnect with one or more input devices, such as a keyboard, mouse, camera, touch screen and a microphone, or with one or more output devices such as a display screen and a speaker.

Each network interface 110B enables computing device 1100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g., Wi-Fi, WiMAX), SS7 signaling network, fixed line, local area network, wide area network, and others, including various combinations of these.

For simplicity only, one computing device 1100 is shown but system 100B may include multiple computing devices 1100. The computing devices 1100 may be the same or different types of devices. The computing devices 1100 may be connected in various ways including directly coupled, indirectly coupled via a network, and distributed over a wide geographic area and connected via a network (which may be referred to as "cloud computing").

For example, and without limitation, a computing device 1100 may be a server, network appliance, set-top box, embedded device, computer expansion module, personal computer, laptop, personal data assistant, cellular telephone, smartphone device, UMPC tablets, video display terminal, gaming console, or various other computing device capable of being configured to carry out the methods described herein.

Applicant notes that the described embodiments and examples are illustrative and non-limiting. Practical implementation of the features may incorporate a combination of some or all of the aspects, and features described herein should not be taken as indications of future or existing product plans.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

Throughout the foregoing discussion, numerous references may have been made in respect of packet controllers, servers, instances, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a packet controller may implement the technical solution of the described embodiments in the form of a software product. The software product may be stored in a non-volatile or non-transitory storage medium, which can be a CD-ROM, a USB flash disk, or a hard disk (removable or otherwise). The software product includes a number of instructions that enable a computer device (e.g., the packet controller, or network device) to execute the methods provided by the embodiments.

As can be understood, the examples described above and illustrated are intended to be exemplary only.

What is claimed is:

1. A packet communication controller coupled to a plurality of network connections, each having a corresponding output queue from a plurality of output queues, the packet communication controller including a processor configured to:

monitor and maintain, in a data object, network characteristics associated with each network of the plurality of networks such that each network of the plurality of networks can be ordered in an order sequence based on the network characteristics;

monitor whether a trigger event has occurred within the plurality of network connections, the trigger event including at least one of new data packets in an input queue of the plurality of connections, an acknowledgement that one or more previous data packets have been received at a destination device, and a negative acknowledgement that the one or more previous data packets have been received at the destination device;

upon determining that the trigger event has occurred:

establish the order sequence for network connections of a selected set of network connections based on the network characteristics;

assign one or more data packets of unassigned data packets of the input queue to one or more corresponding output queues of the plurality of networks by assigning the one or more data packets to successive available network connections based on availability and the order sequence;

update the data object storing the monitored network characteristics of the corresponding plurality of networks based on the one or more data packets which have been assigned to the plurality of network connections;

assess the updated data object to determine that a current congestion window of the network connections has not been consumed by the assigned one or more data packets; and communicate the assigned data packets from the plurality of output queues to the destination device;

wherein:

for each of the plurality of network connections, measure the monitored network characteristics by:

estimating at least one of a transmission rate of a bottleneck link, a round-trip time, and a round-trip propagation time; and comparing the at least one of the estimated round-trip propagation time, the estimated round-trip time, and the estimated transmission rate to, respective reference ranges of at least one of round-trip propagation times, reference ranges of round-trip times, and reference ranges of transmission to establish a score value for each of the at least one of the estimated round-trip propagation time, the estimated round-trip time, and the estimated transmission rate under consideration;

measure modified monitored network characteristics that include system overhead processing time, and utilize either the original network characteristics or the modified network characteristics to determine at least one of a bandwidth delay product (BDP) and a congestion window;

order the plurality of networks in the order sequence based on the score values for each of the plurality of networks and the at least one of the estimated transmission rate of a bottleneck link, the estimated round-trip time, the estimated round-trip propagation time, the BDP, and the congestion window;

wherein the measured monitored network characteristics are measured across a dynamically adjusted sliding window history corresponding to a duration of one or more corresponding sliding window histories, the duration is adjusted based on at least one of packet loss and changes in the round-trip time, where dynamically adjusting the duration of one or more corresponding sliding window histories includes shortening the duration of the one or more corresponding sliding window histories when a packet loss event or an increase in round-trip time is monitored.

2. The packet communication controller of claim 1, wherein the packet communication controller is a push scheduler, and wherein the processor, to determine whether monitored network characteristics of the plurality of networks are suitable, is further configured to:

measure a transmission capacity of each of the plurality of network connections; and assign the one or more data packets while there is available transmission capacity of one or more of the plurality of network connections.

3. The packet communication controller of claim 1, wherein the processor is further configured to assign the one or more data packets when sensing new data packets in the input queue or when receiving an acknowledgement that one or more previous data packets have been received at the destination device.

4. The packet communication controller of claim 1, wherein the estimating of the at least one of a transmission rate of a bottleneck link, a round-trip time, and a round-trip propagation time includes estimation of plurality of score values for at least two of the transmission rate of the bottleneck link, the round-trip time, and the round-trip propagation time, and the order sequence is based on a comparison of the score values corresponding to a pre-defined most important characteristic, and if the score values corresponding to the pre-defined most important characteristic are equal, proceeding to a pre-defined next most important characteristic for comparison.

5. The packet communication controller of claim 4, wherein the processor is configured to conduct a flow classification of the unassigned data packets, and based on the flow classification, the pre-defined most important characteristic and the pre-defined next most important characteristic are identified.

6. The packet communication controller of claim 1, the processor is further configured to:

estimate a Mathis factor data value indicative of a relative upper bound for throughput achievable on the network connection of the plurality of network connections, given the network connection's round-trip time and packet loss;

compare the estimated Mathis factor data value to a reference range of Mathis factor data values; and wherein the ordered sequence of the plurality of networks is further based on the comparison of the estimated Mathis factor data value against the reference range.

7. The packet communication controller of claim 1, wherein the processor is configured to conduct a flow classification of the unassigned data packets, and based on the flow classification, the pre-defined most important characteristic and the pre-defined next most important characteristic are identified.

8. The packet communication controller of claim 1, wherein, to order the plurality of networks, the processor is further configured to:

estimate a capacity factor indicative of efficient transmission defined at least in part by dividing the reference range of transmission rates of the bottleneck link by the reference range of round-trip propagation times;

compare the estimated capacity factor to a reference range of capacity factors; and order of the plurality of networks based on the comparison of the capacity factor.

9. The packet communication controller of claim 1, wherein the processor is configured to:

maintain a nominal time for each of the plurality of networks having available suitable monitored characteristics;

append the maintained nominal time to each of the one or more data packets during assigning the one or more data packets to the one or more output queues, and schedule data packets for pushing out of the respective output queue based on the nominal time associated with the respective data packets.

10. The packet communication controller of claim 1, wherein each of the one or more data packets is associated with one or more data flows, and the processor is configured to:

assign the one or more data packets by:

estimating a data packet classification associated with each of the data packets based on a header associated with the one or more data packet;

determining one or more transmission requirements associated with the estimated data packet classification; and assigning the one or more data packets to the plurality of networks which satisfy the corresponding one or more transmission requirements of the one or more data packet.

11. A method for packet communications using a packet communication controller coupled to a plurality of network connections, each having a corresponding output queue from a plurality of output queues, the method comprising:

monitoring and maintaining, in a data object, network characteristics associated with each network of the plurality of networks such that each network of the plurality of networks can be ordered in an order sequence based on the network characteristics;

monitoring whether a trigger event has occurred within the plurality of network connections, the trigger event including at least one of new data packets in an input queue of the plurality of connections, an acknowledgement that one or more previous data packets have been received at a destination device, and a negative acknowledgement that the one or more previous data packets have been received at the destination device;

upon determining that the trigger event has occurred:

establishing the order sequence for network connections of a selected set of network connections based on the network characteristics;

assigning one or more data packets of unassigned data packets of the input queue to one or more corresponding output queues of the plurality of networks by assigning the one or more data packets to successive available network connections based on availability and the order sequence;

updating the data object storing the monitored network characteristics of the corresponding plurality of networks based on the one or more data packets which have been assigned to the plurality of network connections;

assess the updated data object to determine that a current congestion window of the network connections has not been consumed by the assigned one or more data packets; and communicating the assigned data packets from the plurality of output queues to the destination device;

wherein:

for each of the plurality of network connections, measure the monitored network characteristics by:

estimating at least one of a transmission rate of a bottleneck link, a round-trip time, and a round-trip propagation time; and comparing the at least one of estimated round-trip propagation time, the estimated round-trip time, and the estimated transmission rate to, respective reference ranges of at least one of round-trip propagation times, reference ranges of round-trip times, and reference ranges of transmission to establish a score value for each of the at least one of estimated round-trip propagation time, the estimated round-trip time, and the estimated transmission rate under consideration;

measure modified monitored network characteristics that includes system overhead processing time, and utilize either the original network characteristics or the modified network characteristics to determine at least one of a bandwidth delay product (BDP) and a congestion window, order the plurality of networks in the order sequence based on the score values for each of the plurality of networks and the at east one of the estimated transmission rate of a bottleneck link, the estimated round-trip time, the estimated round-trip propagation time, the BDP, and the congestion window; and wherein the measured monitored network characteristics are measured across a dynamically adjusted sliding window history corresponding to a duration of one or more corresponding sliding window histories, the duration is adjusted based on at least one of packet loss and change e round-trip time where dynamically adjusting the duration of one or more corresponding sliding window histories includes shortening the duration of the one or more corresponding sliding window histories when a packet loss event or an increase in round-trip time is monitored.

12. The method of claim 11, wherein the packet communication controller is a push scheduler, and the method comprises:

measuring a transmission capacity of each of the plurality of network connections; and wherein the assigning of the one or more data packets includes assigning the one or more data packets to a corresponding connection of the plurality of network connections only when there is available transmission capacity of the corresponding connection of the plurality of network connections.

13. The method of claim 11, wherein the assigning of the one or more data packets occur upon sensing new data packets in the input queue or when receiving an acknowledgement that one or more previous data packets have been received at the destination device.

14. The method of claim 11, wherein the estimating of the at least one of a transmission rate of a bottleneck link, a round-trip time, and a round-trip propagation time includes estimation of plurality of score values for at least two of the transmission rate of the bottleneck link, the round-trip time, and the round-trip propagation time, and the order sequence is based on a comparison of the score values corresponding to a pre-defined most important characteristic, and if the score values corresponding to the pre-defined most important characteristic are equal, proceeding to a pre-defined next most important characteristic for comparison.

15. The method of claim 14, further comprising conducting a flow classification of the unassigned data packets, and based on the flow classification, the pre-defined most important characteristic and the pre-defined next most important characteristic are identified.

16. The method of claim 11, further comprising:
estimating a Mathis factor data value indicative of a relative upper bound for throughput achievable on the network connection of the plurality of network connections, given the network connection's round-trip time and packet loss;
comparing the estimated Mathis factor data value to a reference range of Mathis factor data values to determine a Mathis factor score; and
wherein the ordered sequence of the plurality of networks is further based on the comparison of the estimated Mathis factor data value against the reference range.

17. The method of claim 11, wherein, to order the plurality of networks, the method further comprises;
estimating a capacity factor indicative of efficient transmission defined at least in part by dividing the reference range of transmission rates of the bottleneck link by the reference range of round-trip propagation times;
comparing the estimated capacity factor to a reference range of capacity factors to establish an estimated capacity factor score; and
ordering of the plurality of networks based on the comparison of the capacity factor.

18. The method of claim 11, wherein each of the one or more data packets is associated with one or more data flows, and wherein
the assigning of the one or more data packets includes:
estimating a data packet classification associated with each of the data packets based on a header associated with the data packet;
determining one or more transmission requirements associated with the estimated data packet classification; and
assigning the one or more data packets to the plurality of networks which satisfy the corresponding one or more transmission requirements of the one or more data packets.

19. The method of claim 11, further comprising:
maintaining a nominal time for each of the plurality of networks having available suitable monitored characteristics;
appending the maintained nominal time to each of the one or more data packets during assigning the one or more data packets ne or more output queues, and
scheduling data packets for pushing from the respective output queue based on the nominal time associated with the respective data packets.

20. A non-transitory computer readable medium storing machine interpretable instructions, which when executed by a processor, cause the processor to perform a method for packet communications using a packet communication controller coupled to a plurality of network connections, each having a corresponding output queue from a plurality of output queues, the method comprising:
monitoring and maintaining, in a data object, network characteristics associated with each network of the plurality of networks such that each network of the plurality of networks can be ordered in an order sequence based on the network characteristics;
monitoring whether a trigger event has occurred within the plurality of network connections, the trigger event including at least one of new data packets in an input queue of the plurality of connections, an acknowledgement that one or more previous data packets have been received at a destination device, and a negative acknowledgement that the one or more previous data packets have been received at the destination device;
upon determining that the trigger event has occurred:
establishing the order sequence for network connections of a selected set of network connections based on the network characteristics;
assigning one or more data packets of unassigned data packets of the input queue to one or more corresponding output queues of the plurality of networks by assigning the one or more data packets to successive available network connections based on availability and the order sequence;
updating the data object storing the monitored network characteristics of the corresponding plurality of networks based on the one or more data packets which have been assigned to the plurality of network connections;
assess the updated data object to determine that a current congestion window of the network connections has not been consumed by the assigned one or more data packets; and
communicating the assigned data packets from the plurality of output queues to the destination device;
wherein:
for each of the plurality of network connections, measure the monitored network characteristics by:
estimating at least one of a transmission rate of a bottleneck link, a round-trip time, and a round-trip propagation time; and
comparing the at least one of the estimated round-trip propagation time, the estimated round-trip time, and the estimated transmission rate to, respective reference ranges of at least one of round-trip propagation times, reference ranges of round-trip times, and reference ranges of transmission to establish a score value for each of the at least one of estimated round-trip propagation time, the estimated round-trip time, and the estimated transmission rate under consideration;
measure modified monitored network characteristics that includes system overhead processing time, and utilize either the original network characteristics or the modified network characteristics to determine at least one of a bandwidth delay product (BDP) and a congestion window;
order the plurality of networks in the order sequence based on the score values for each of the plurality of networks and the at least one of the estimated transmission rate of a bottleneck link, the estimated round-trip time, the estimated round-trip propagation time, the BDP, and the congestion window; and
wherein the measured monitored network characteristics are measured across a dynamically adjusted sliding window history corresponding to a duration of one or more corresponding sliding window histories, the duration is adjusted based on at least one of packet loss and changes in the round-trip time, where dynamically adjusting the duration of one or more corresponding sliding window histories includes shortening the duration of the one or more corresponding sliding window histories when a packet loss event or an increase in round-trip time is monitored.

\* \* \* \* \*